(12) United States Patent
Mohri et al.

(10) Patent No.: US 11,307,111 B2
(45) Date of Patent: **\*Apr. 19, 2022**

(54) KNOCKING DETECTION SYSTEM AND KNOCKING DETECTION METHOD OF INTERNAL COMBUSTION ENGINE

(71) Applicant: TOYOTA JIDOSHA KABUSHIKI KAISHA, Toyota (JP)

(72) Inventors: Masahiro Mohri, Nisshin (JP); Akinori Kitazume, Nagoya (JP); Daisuke Kobayashi, Kasugai (JP); Kenji Senda, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 95 days.

This patent is subject to a terminal disclaimer.

(21) Appl. No.: 16/752,723

(22) Filed: Jan. 27, 2020

(65) Prior Publication Data

US 2020/0256753 A1 Aug. 13, 2020

(30) Foreign Application Priority Data

Feb. 8, 2019 (JP) .............................. JP2019-021508

(51) Int. Cl.
*F02D 35/02* (2006.01)
*G01L 23/22* (2006.01)
(Continued)

(52) U.S. Cl.
CPC .......... *G01L 23/222* (2013.01); *F02D 41/22* (2013.01); *G06N 3/08* (2013.01); *F02D 2200/024* (2013.01)

(58) Field of Classification Search
CPC ... G01L 23/222; F02D 41/22; F02D 41/2445; F02D 41/1405; F02D 2200/024;
(Continued)

(56) References Cited

U.S. PATENT DOCUMENTS 4,633,835 A 1/1987 Akasu
4,899,710 A 2/1990 Takahashi
(Continued)

FOREIGN PATENT DOCUMENTS

CN 101044383 A 9/2007
CN 103134637 A 6/2013
(Continued)

OTHER PUBLICATIONS

Andreas Kirschbaum, et al., "Rapid Prototyping of a Co-Processor based Engine Knock Detection System," Rapid System Prototyping, 1998. Proceedings. 1998 Ninth International Workshop on Leuven, Belgium, Jun. 1998, pp. 124-129.

(Continued)

*Primary Examiner* — Hai H Huynh
(74) *Attorney, Agent, or Firm* — Oblon, McClelland, Maier & Neustadt, L.L.P.

(57) ABSTRACT

A knocking sensor detecting vibration of an engine body and a pressure sensor detecting a pressure of a combustion chamber are provided. A value representing the knocking strength is acquired from output values of the pressure sensor. Weights of a neural network are learned using a value representing the vibration of the engine body detected by the knocking sensor as an input value of the neural network and using the acquired value representing the knocking strength as training data. The value representing the knocking strength is estimated from the output values of the knocking sensor by using the learned neural network.

12 Claims, 17 Drawing Sheets

(51) Int. Cl.
*F02D 41/22* (2006.01)
*G06N 3/08* (2006.01)

(58) Field of Classification Search
CPC ....... F02D 35/027; F02D 35/023; G06N 3/08; G01M 15/12; G01M 15/08; G01M 15/05
USPC .... 123/435, 406.13, 406.16, 406.22, 406.33, 123/406.34, 406.37; 73/35.09, 114.07; 701/111
See application file for complete search history.

(56) References Cited

U.S. PATENT DOCUMENTS

| | | | |
|---|---|---|---|
| 6,012,425 | A | 1/2000 | Unland et al. |
| 11,092,130 | B2 | 8/2021 | Senda et al. |
| 2002/0195085 | A1 | 12/2002 | Katagami |
| 2005/0126537 | A1 | 6/2005 | Daniels et al. |
| 2006/0185422 | A1 | 8/2006 | Iwade et al. |
| 2017/0076719 | A1 | 3/2017 | Lee et al. |
| 2020/0256753 | A1 | 8/2020 | Mohri et al. |
| 2021/0088019 | A1* | 3/2021 | Senda ................. F02D 41/0072 |
| 2021/0088021 | A1* | 3/2021 | Mori ...................... G06N 3/088 |

FOREIGN PATENT DOCUMENTS

| | | |
|---|---|---|
| EP | 3 040 544 A1 | 7/2016 |
| EP | 3 521 601 A1 | 8/2019 |
| JP | 59-193333 A | 11/1984 |
| JP | 08-026838 B2 | 3/1996 |
| JP | 10-252536 A | 9/1998 |
| JP | 2005-120896 A | 5/2005 |
| JP | 2006-226967 A | 8/2006 |
| JP | 2008-25510 A | 2/2008 |
| JP | 4-367529 B2 | 11/2009 |
| JP | 2015-75019 A | 4/2015 |
| JP | 2016-217338 A | 12/2016 |
| JP | 2017-054122 A | 3/2017 |
| JP | 2018-53748 A | 4/2018 |
| JP | 2018-53844 A | 4/2018 |

OTHER PUBLICATIONS

Notice of Allowance issued in U.S. Appl. No. 16/940,645 dated Oct. 19, 2021.
Corrected Notice of Allowability issued in U.S. Appl. No. 16/940,645 dated Dec. 3, 2021.
Notice of Allowance issued in U.S. Appl. No. 16/940,645 dated Feb. 7, 2022.

* cited by examiner

FIG. 9

| No. | $x_1$ | $x_2$ | · · · · · · · · · · · · · | $x_{n-1}$ | $x_n$ | $y_t$ |
|---|---|---|---|---|---|---|
| 1 | $x_{11}$ | $x_{21}$ | · · · · · · · · · · · · · | $x_{n-11}$ | $x_{n1}$ | $y_{t1}$ |
| 2 | $x_{12}$ | $x_{22}$ | · · · · · · · · · · · · · | $x_{n-12}$ | $x_{n2}$ | $y_{t2}$ |
| ⋮ | ⋮ | ⋮ | ⋮ | ⋮ | ⋮ | ⋮ |
| m−1 | $x_{1m-1}$ | $x_{2m-1}$ | · · · · · · · · · · · · · | $x_{n-1m-1}$ | $x_{nm-1}$ | $y_{tm-1}$ |
| m | $x_{1m}$ | $x_{2m}$ | · · · · · · · · · · · · · | $x_{n-1m}$ | $x_{nm}$ | $y_{tm}$ |

FIG. 24

| No. | $x_1$ | $x_2$ | $\cdots$ | $xx_{n-1}$ | $xx_n$ | $y_t$ |
|---|---|---|---|---|---|---|
| 1 | $x_{11}$ | $x_{21}$ | $\cdots$ | $xx_{n-11}$ | $xx_{n1}$ | $y_{t1}$ |
| 2 | $x_{12}$ | $x_{22}$ | $\cdots$ | $xx_{n-12}$ | $xx_{n2}$ | $y_{t2}$ |
| $\vdots$ | $\vdots$ | $\vdots$ | $\vdots$ | $\vdots$ | $\vdots$ | $\vdots$ |
| m−1 | $x_{1m-1}$ | $x_{2m-1}$ | $\cdots$ | $xx_{n-1m-1}$ | $xx_{nm-1}$ | $y_{tm-1}$ |
| m | $x_{1m}$ | $x_{2m}$ | $\cdots$ | $xx_{n-1m}$ | $xx_{nm}$ | $y_{tm}$ |

KNOCKING DETECTION SYSTEM AND KNOCKING DETECTION METHOD OF INTERNAL COMBUSTION ENGINE

FIELD

The present invention relates to a knocking detection system and knocking detection method of an internal combustion engine.

BACKGROUND

In an internal combustion engine, if end gas self ignites in a combustion chamber, a pressure wave is generated and a knocking occurs. If a knocking occurs, the engine body vibrates and, in this case, the higher the knocking strength, the stronger the vibration of the engine body. Therefore, known in the art is an internal combustion engine configured to attach a knocking sensor detecting vibration of the engine body to the engine body and detect the knocking strength from the strength of the vibration of the engine body detected by the knocking sensor (for example, see Japanese Unexamined Patent Publication No. 2006-226967).

However, an engine body also vibrates due to, for example, seating actions of intake valves and exhaust valves, seating actions of needles of fuel injectors, and other mechanical operations. Therefore, if using a knocking sensor configured to detect vibration of the engine body, there is the problem that when the strength of the vibration of the engine body becomes greater due to such mechanical operations, the knocking strength will end up being mistakenly judged as being high despite the knocking strength not being high.

SUMMARY OF INVENTION

On the other hand, when knocking occurs, the higher the knocking strength, the greater the fluctuation of pressure in combustion chambers. Therefore, if using a pressure sensor able to detect the pressure inside the combustion chambers, it becomes possible to detect the knocking strength from the strength of the fluctuations of the output values of this pressure sensor. In this case, for example, if the knocking strength becomes high, the peak value of the output values of the pressure sensor becomes high. Therefore, the peak value of the output values of this pressure sensor can be said to be one value representing the knocking strength. Therefore, it becomes possible to detect the knocking strength from such a value representing the knocking strength. In this case, vibration of the engine body due to mechanical operations does not affect the output values of the pressure sensor. Therefore, the value representing the knocking strength is also not affected, so if using a pressure sensor, it becomes possible to precisely detect the knocking strength.

However, this pressure sensor is extremely expensive. Further, if a pressure sensor is used for a long period of time, a deposit will gradually build up on the pressure sensor. Due to the built-up deposit, the mode of combustion of the air-fuel mixture in the combustion chambers will end up changing. Therefore, in generally marketed cars, use of such a pressure sensor would be difficult. Therefore, in the present invention, a value representing the knocking strength found from the output values of the pressure sensor is estimated from the output values of the knocking sensor using a neural network.

That is, according to a first aspect of the invention, there is provided a knocking detection system of an internal combustion engine comprising:
a knocking sensor detecting vibration of an engine body,
a pressure sensor detecting a pressure inside a combustion chamber of the internal combustion engine, and
a learning device for using a neural network to estimate a value representing a knocking strength of the internal combustion engine, wherein
the value representing the knocking strength is acquired from output values of the pressure sensor,
weights of the neural network are learned by the learning device by using the value representing vibration of the engine body detected by the knocking sensor as an input value of the neural network and using the acquired value representing the knocking strength as training data, and
the value representing the knocking strength is estimated from the output values of the knocking sensor by using the learned neural network.

According to a second aspect of the invention, there is provided a knocking detection method of an internal combustion engine using a neural network to estimate a knocking strength of the internal combustion engine based output values of a knocking sensor detecting vibration of an engine body and output values of a pressure sensor detecting a pressure of a combustion chamber of the internal combustion engine, wherein said knocking detection method comprises:
finding a value representing the knocking strength from the output values of the pressure sensor,
preparing a training data set showing a relationship between the value representing vibration of the engine body detected by the knocking sensor and the value representing the knocking strength,
learning weights of the neural network using the value representing vibration of the engine body detected by the knocking sensor as an input value of the neural network and using the acquired value representing the knocking strength as training data, and
using the learned neural network to estimate the value representing the knocking strength from the output values of the knocking sensor.

In both of the first aspect and second aspect of the invention, it is possible to obtain a value representing the knocking strength found from output values of a pressure sensor by a high precision without using a pressure sensor.

BRIEF DESCRIPTION OF DRAWINGS

FIG. 9 is a view showing a training data set.

FIG. 24 is a view showing a training data set.

DESCRIPTION OF EMBODIMENTS

Overall Configuration of Internal Combustion Engine

Figure 1:
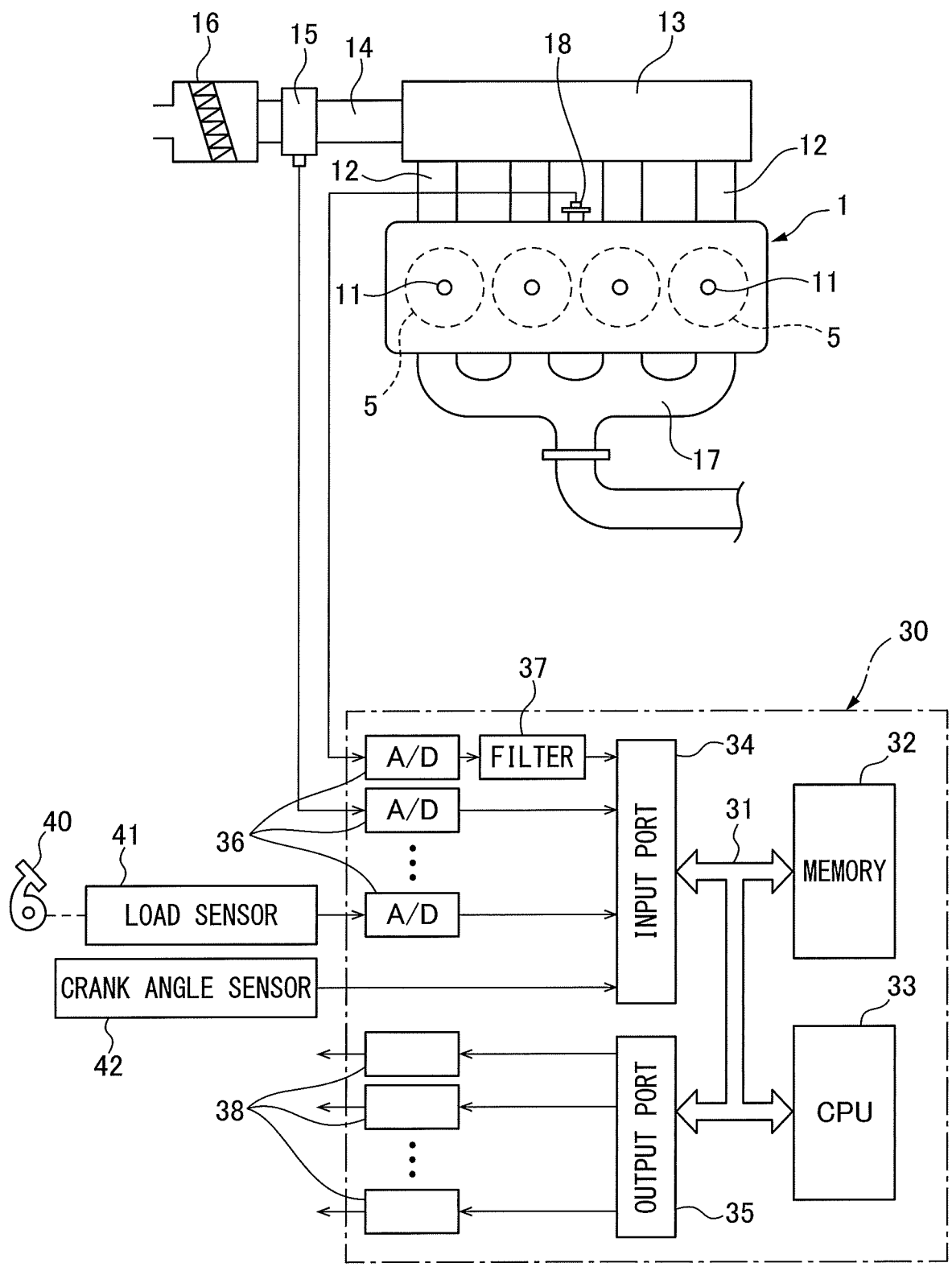
FIG. 1 is an overall view of an internal combustion engine.
Figure 2:
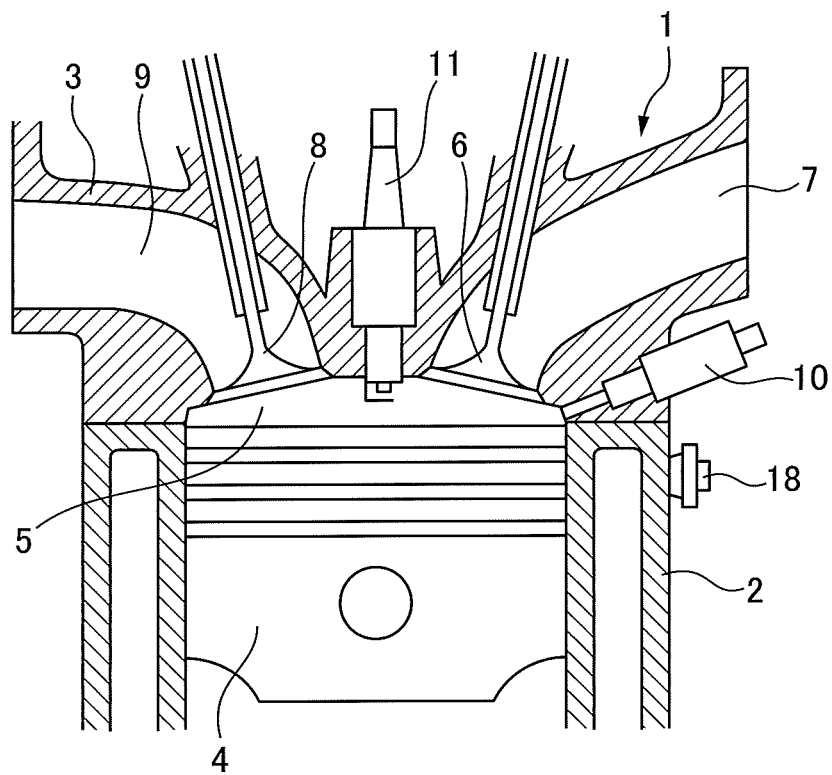
FIG. 2 is a side cross-sectional view of the internal combustion engine shown in FIG. 1.

FIG. 1 and FIG. 2 show overall views of an internal combustion engine. Referring to FIG. 2, 1 indicates an engine body, 2 a cylinder block, 3 a cylinder head, 4 a piston reciprocating inside the cylinder block 2, 5 a combustion chamber, 6 an intake valve, 7 an intake port, 8 an exhaust valve, 9 an exhaust port, 10 a fuel injector for supplying fuel, for example, gasoline to the inside of each combustion chamber 5, and 11 a spark plug arranged in each combustion chamber 5. If referring to FIG. 1 and FIG. 2, each intake port 7 is connected with a surge tank 13 through a respectively corresponding intake branch pipe 12 while the surge tank 13 is connected through an intake duct 14 and intake air detector 15 to an air cleaner 16. On the other hand, each exhaust port 9 is connected to an exhaust manifold 17.

As shown in FIG. 1 and FIG. 2, in the embodiment shown in FIG. 1, at the cylinder block 2, a knocking sensor 18 is attached for detecting vibration of the cylinder block 2, that is, vibration of the engine body 1. In the example shown in FIG. 1, in this knocking sensor 18, a piezoelectric device is used as the device for detection of vibration. This knocking sensor 18 generates an output voltage proportional to the vibration of the engine body 1. Note that, if knocking occurs, vibration of a frequency of 5 kHz to 20 kHz or so is generated at the engine body 1. The output voltage of the knocking sensor 18 at this time fluctuates in frequency from 5 kHz to 20 kHz or so. Therefore, it becomes possible to detect the occurrence of knocking from the fluctuation of the output voltage of the knocking sensor 18, that is, fluctuation of the output values of the knocking sensor 18.

On the other hand, in FIG. 1, 30 shows an electronic control unit for controlling the operation of the engine. As shown in FIG. 1, the electronic control unit 30 is comprised of a digital computer provided with a storage device 32, that is, a memory 32, a CPU (microprocessor) 33, input port 34, and output port 35, which are connected to each other by a bidirectional bus 31. At the input port 34, an output signal of the knocking sensor 18 is input through a corresponding AD converter 36 and a digital bandpass filter 37 passing only input signals of a frequency of 5 kHz to 20 kHz or so. Further, at the input port 34, an output signal of the intake air detector 15 is input through a corresponding AD converter 36. Further, at an accelerator pedal 40, a load sensor 41 generating an output voltage proportional to an amount of depression of the accelerator pedal 40 is connected. The output voltage of the load sensor 41 is input through a corresponding AD converter 36 to the input port 34. Further, at the input port 34, a crank angle sensor 42 generating an output pulse every time a crankshaft rotates by, for example, 30° is connected. Inside the CPU 33, an engine speed is calculated based on an output signal of the crank angle sensor 42. On the other hand, the output port 35 is connected to the fuel injectors 10 and spark plugs 11 of the cylinders through the corresponding drive circuits 38.

Summary of Neural Network

Figure 3:
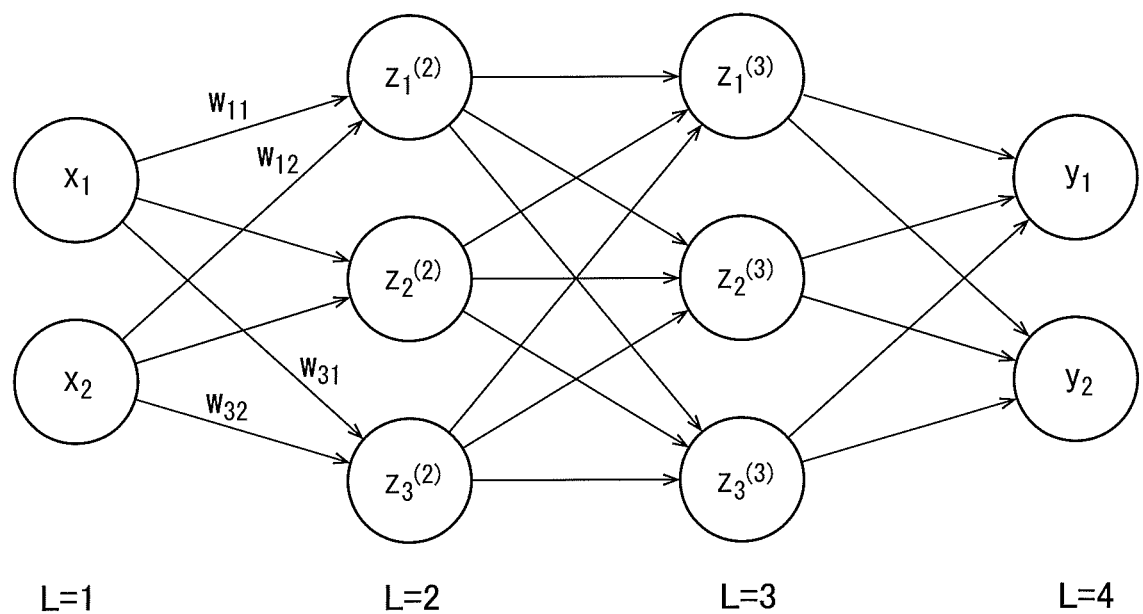
FIG. 3 is an explanatory view of a neural network.

In an embodiment according to the present invention, a neural network is used to estimate a value representing the knocking strength. Therefore, first, a neural network will be briefly explained. FIG. 3 shows a simple neural network. The circle marks in FIG. 3 show artificial neurons. In the neural network, these artificial neurons are usually called "nodes" or "units" (in the present application, they are called "nodes"). In FIG. 3, L=1 shows an input layer, L=2 and L=3 show hidden layers, and L=4 shows an output layer. Further, in FIG. 3, $x_1$ and $x_2$ show output values from nodes of the input layer (L=1), $y_1$ and $y_2$ show output values from the nodes of the output layer (L=4), $z^{(2)}_1$, $z^{(2)}_2$, and $z^{(2)}_3$ show output values from the nodes of one hidden layer (L=2), and $z^{(3)}_1$, $z^{(3)}_2$, and $z^{(3)}_3$ show output values from the nodes of another hidden layer (L=3). Note that, the numbers of hidden layers may be made one or any other numbers, while the number of nodes of the input layer and the numbers of nodes of the hidden layers may also be made any numbers. Further, the number of nodes of the output layer may be made a single node, but may also be made a plurality of nodes.

At the nodes of the input layer, the inputs are output as they are. On the other hand, the output values $x_1$ and $x_2$ of the nodes of the input layer are input at the nodes of the hidden layer (L=2), while the respectively corresponding weights "w" and biases "b" are used to calculate sum input values "u" at the nodes of the hidden layer (L=2). For example, a sum input value $u_k$ calculated at a node shown by $z^{(2)}_k$ (k=1, 2, 3) of the hidden layer (L=2) in FIG. 3 becomes as shown in the following equation:

$$U_k = \sum_{m=1}^{n}(x_m \cdot w_{km}) + b_k$$

Next, this sum input value $u_k$ is converted by an activation function "f" and is output from a node shown by $z^{(2)}_k$ of the hidden layer (L=2) as an output value $z^{(2)}_k$ ($=f(u_k)$). On the other hand, the nodes of the hidden layer (L=3) receive as input the output values $z^{(2)}_1$, $z^{(2)}_2$, and $z^{(2)}_3$ of the nodes of the hidden layer (L=2). At the nodes of the hidden layer (L=3), the respectively corresponding weights "w" and biases "b" are used to calculate the sum input values "u" ($\Sigma z \cdot w + b$). The sum input values "u" are similarly converted by an activation function and output from the nodes of the hidden layer (L=3) as the output values $z^{(3)}_1$, $z^{(3)}_2$, and $z^{(3)}_3$. As this activation function, for example, a Sigmoid function σ is used.

On the other hand, at the nodes of the output layer (L=4), the output values $z^{(3)}_1$, $z^{(3)}_2$, and $z^{(3)}_3$ of the nodes of the hidden layer (L=3) are input. At the nodes of the output layer, the respectively corresponding weights "w" and biases "b" are used to calculate the sum input values "u" ($\Sigma z \cdot w + b$) or just the respectively corresponding weights "w" are used to calculate the sum input values "u" ($\Sigma z \cdot w$). In this embodiment according to the present invention, at the nodes of the output layer, an identity function is used, therefore, from the nodes of the output layer, the sum input values "u" calculated at the nodes of the output layer are output as they are as the output values "y".

Learning in Neural Network

Now then, if designating the training data showing the truth values of the output values "y" of the neural network as $y_t$, the weights "w" and biases "b" in the neural network are learned using the error backpropagation algorithm so that the difference between the output values "y" and the training data $y_t$ becomes smaller. This error backpropagation algorithm is known. Therefore, the error backpropagation algorithm will be explained simply below in its outlines. Note that, a bias "b" is one kind of weight "w", so below, a bias "b" will be also included in what is referred to as weight "w". Now then, in the neural network such as shown in FIG. 3, if the weights at the input values $u^{(L)}$ to the nodes of the layers of L=2, L=3, or L=4 are expressed by $w^{(L)}$, the differential due to the weights $w^{(L)}$ of the error function E, that is, the slope $\partial E/\partial w^{(L)}$, can be rewritten as shown in the following equation:

$$\partial E/\partial w^{(L)} = (\partial E/\partial u^{(L)})(\partial u^{(L)}/\partial w^{(L)}) \quad (1)$$

where, $z^{(L-1)} \cdot \partial w^{(L)} = \partial u^{(L)}$, so if $(\partial E/\partial u^{(L)}) = \delta^{(L)}$, the above equation (1) can be shown by the following equation:

$$\partial E/\partial w^{(L)} = \delta^{(L)} \cdot z^{(L-1)} \quad (2)$$

where, if $u^{(L)}$ fluctuates, fluctuation of the error function E is caused through the change in the sum input value $u^{(L+1)}$ of the following layer, so $\delta^{(L)}$ can be expressed by the following equation:

$$\delta^{(L)} = (\partial E/\partial u^{(L)}) = \sum_{k=1}^{k} (\partial E/\partial u_k^{(L+1)})(\partial u_k^{(L+1)}/\partial u^{(L)})(k=1, 2 \ldots) \quad (3)$$

where, if expressing $z^{(L)} = f(u^{(L)})$, the input value $u_k^{(L+1)}$ appearing at the right side of the above equation (3) can be expressed by the following formula:

$$\text{input value } u_k^{(L+1)} = \sum_{k=1}^{k} w_k^{(L+1)} \cdot z^{(L)} = \sum_{k=1}^{k} w_k^{(L+1)} \cdot f(u^{(L)}) \quad (4)$$

where, the first term $(\partial E/\partial u^{(L+1)})$ at the right side of the above equation (3) is $\delta^{(L+1)}$, and the second term $(\partial u_k^{(L+1)}/\partial u^{(L)})$ at the right side of the above equation (3) can be expressed by the following equation:

$$\partial(w_k^{(L+1)} \cdot z^{(L)})/\partial u^{(L)} = w_k^{(L+1)} \cdot \partial f(u^{(L)}) = w_k^{(L+1)} \cdot f'(u^{(L)}) \quad (5)$$

Therefore, $\delta^{(L)}$ is shown by the following formula.

$$\delta^{(L)} = \sum_{k=1}^{k} w_k^{(L+1)} \cdot \delta^{(L+1)} \cdot f'(u^{(L)})$$

That is, $$\delta^{(L-1)} = \sum_{k=1}^{k} w_k^{(L)} \cdot \delta^{(L)} \cdot f'(u^{(L-1)}) \quad (6)$$

That is, if $\delta^{(L+1)}$ is found, it is possible to find $\delta^{(L)}$.

Now then, if there is a single node of the output layer (L=4), training data $y_t$ is found for a certain input value, and the output values from the output layer corresponding to this input value are "y", if the square error is used as the error function, the square error E is found by $E = \frac{1}{2}(y - y_t)^2$. In this case, at the node of the output layer (L=4), the output values "y" become $f(u^{(L)})$, therefore, in this case, the value of $\delta^{(L)}$ at the node of the output layer (L=4) becomes like in the following equation:

$$\delta^{(L)} = \partial E/\partial u^{(L)} = (\partial E/\partial y)(\partial y/\partial u^{(L)}) = (y - y_t) \cdot f'(u^{(L)}) \quad (7)$$

In this case, in the embodiments of the present invention, as explained above, $f(u^{(L)})$ is an identity function and $f'(u^{(L)}) = 1$. Therefore, this leads to $\delta^{(L)} = y - y_t$ and $\delta^{(L)}$ is found.

If $\delta^{(L)}$ is found, the above equation (6) is used to find the $\delta^{(L-1)}$ of the previous layer. The $\delta$'s of the previous layer are successively found in this way. Using these values of $\delta$'s, from the above equation (2), the differential of the error function E, that is, the slope $\delta E/\delta w^{(L)}$, is found for the weights "w". If the slope $\partial E/\partial w^{(L)}$ is found, this slope $\partial E/\partial w^{(L)}$ is used to update the weights "w" so that the value of the error function E decreases. That is, the values of the weights "w" are learned. Note that, as shown in FIG. 3, when the output layer (L=4) has a plurality of nodes, if making the output values from the nodes $y_1, y_2 \ldots$ and making the corresponding teacher data $y_{t1}, y_{t2} \ldots$, as the error function E, the following square sum error E is used:

$$\text{Square sum error } E = \frac{1}{2}\sum_{k=1}^{n} (y_k - y_{tk})^2 \quad (8)$$

("n" is number of nodes of output layer)

In this case as well, the values of $\delta^{(L)}$ at the nodes of the output layer (L=4) become $\delta^{(L)} = y - y_{tk}$ (k=1, 2, ... n). From the values of these $\delta^{(L)}$, the above formula (6) is used to find the $\delta^{(L-1)}$ of the previous layers.

Embodiments According to Present Invention

Now then, in an internal combustion engine, the higher the knocking strength, the stronger the vibration of the engine body 1. Therefore, as shown in FIG. 1 and FIG. 2, by attaching the knocking sensor 18 to the engine body 1, it is possible detect the knocking strength from the strength of the vibration of the engine body detected by the knocking sensor 18. However, as explained above, the engine body 1 also vibrates, for example, due to the seating actions of the intake valves 6 and exhaust valves 8, the seating actions of the needles of the fuel injectors 10, and other mechanical operations. Therefore, if using the knocking sensor 18 configured to detect vibration of the engine body 1, there is the problem that when the strength of the vibration of the engine body increases due to such mechanical operations, the knocking strength ends up being mistakenly judged to be high regardless of the knocking strength not being high.

On the other hand, as explained above, if using a pressure sensor able to detect the pressure inside the combustion chambers 5, it is possible to detect the knocking strength from the strength of fluctuations of the output values of this pressure sensor. In this case, for example, if the knocking strength becomes higher, the peak value of the output values of the pressure sensor becomes higher. Therefore, the peak value of the output values of this pressure sensor can be said to be one value representing the knocking strength. Therefore, it becomes possible to detect the knocking strength from such a value representing the knocking strength. In this case, vibration of the engine body due to mechanical operations does not affect the output values of the pressure sensor. Therefore, it also does not affect the value representing the knocking strength, so if using the pressure sensor, it becomes possible to precisely detect the knocking strength.

However, this pressure sensor is extremely expensive. Further, due to a deposit which gradually builds up on the pressure sensor, the mode of combustion of the air-fuel mixture in the combustion chambers 5 will end up changing. Therefore, in generally marketed cars, use of such a pressure sensor would be difficult. Therefore, in the present invention, a value representing the knocking strength found from the output values of the pressure sensor is estimated using a neural network from the output values of the knocking sensor. In explaining this, first, while referring to FIG. 4, FIG. 5, FIG. 6A to FIG. 6C, and FIG. 7A to FIG. 7C, output values of a knocking sensor, output values of a pressure sensor, and a value representing the knocking strength found from output values of a pressure sensor will be explained.

Figure 4:
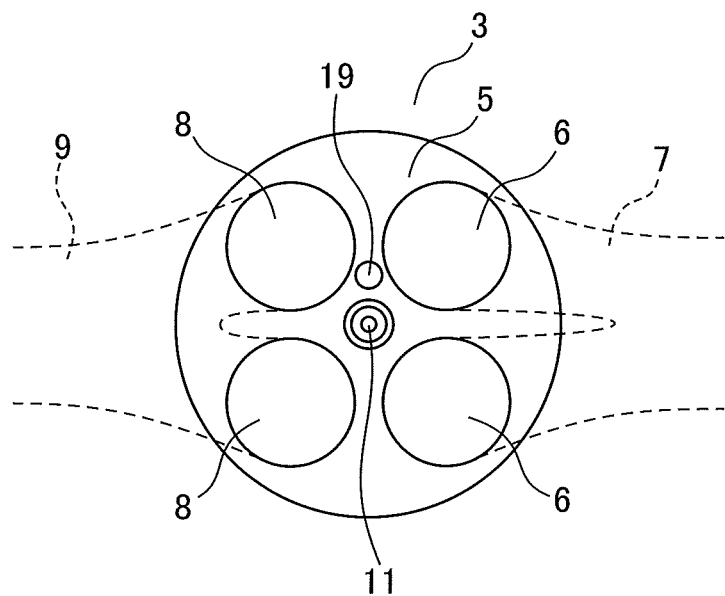
FIG. 4 is a bottom view of a cylinder head.
Figure 5:
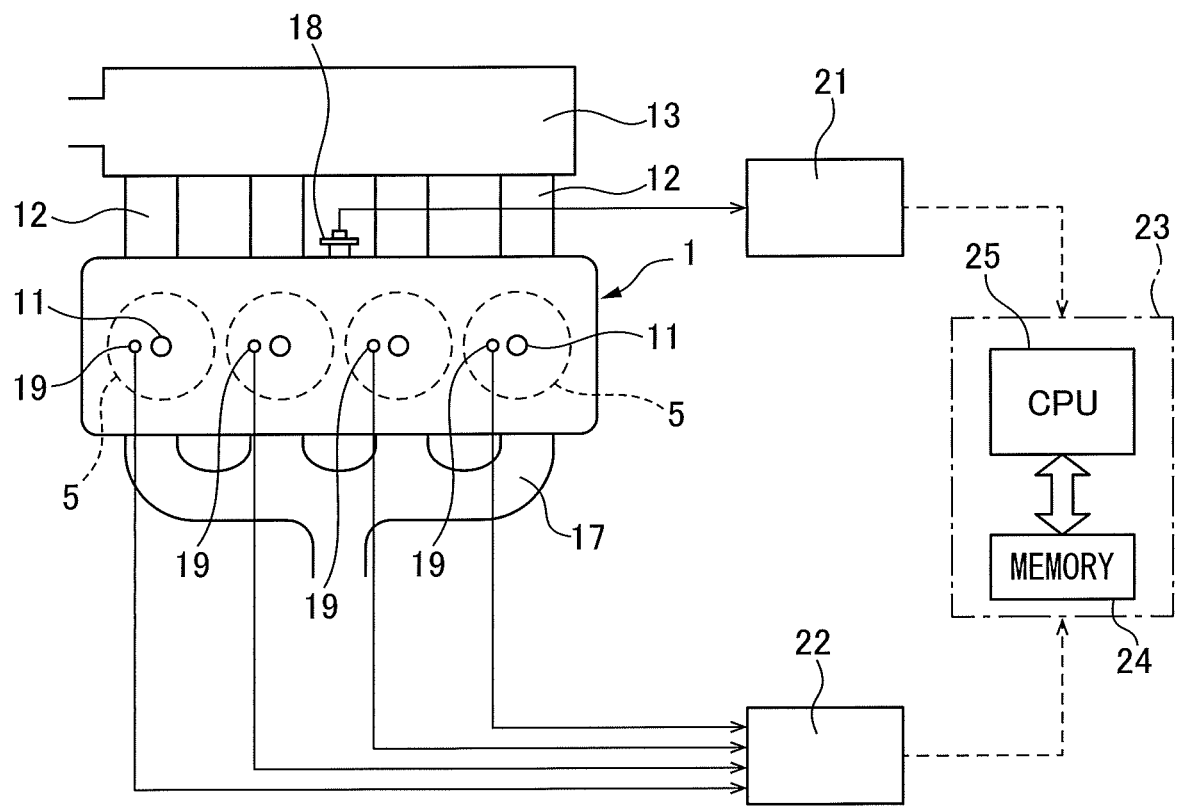
FIG. 5 is an overall view of an internal combustion engine.

FIG. 4 is a bottom view of the cylinder head 3 shown in FIG. 2, while FIG. 5 shows part of the engine body 1 shown in FIG. 1. If referring to FIG. 4 and FIG. 5, to estimate from the output values of the knocking sensor 18 a value representing the knocking strength found from the output values of the pressure sensor, a pressure sensor 19 is placed on the inside wall surface of the cylinder head 3 at each cylinder. From each pressure sensor 19, output voltages proportional to the pressure inside the corresponding combustion chamber 5, that is, the output values showing the pressure inside the combustion chamber 5, are output. Note that, in this case, the pressure inside the combustion chamber 5 can be measured using a pressure sensor of a type integral with a spark plug. Further, each pressure sensor 19 is used only for acquiring data required for learning.

Now then, knocking usually occurs from compression top dead center to 90° after compression top dead center. When knocking occurs, a fluctuation of pressure in the combustion chamber 5 having a frequency of 5 kHz to 20 kHz or so and vibration of the engine body 1 having a frequency of 5 kHz to 20 kHz or so are caused. Therefore, to extract only the vibration of the engine body 1 due to the knocking, usually the output values of the knocking sensor 18 are converted from an analog to digital form, then are sent to a digital bandpass filter allowing the passage of only an input signal of a frequency of for example 5 kHz to 20 kHz or so. The strength of the knocking is judged based on the output values of the knocking sensor 18 after filtering by this digital bandpass filter.

Similarly, to extract only the pressure fluctuation in the combustion chamber 5 due to knocking, usually the output values of the pressure sensor 19 are also converted from an analog to digital form, then are sent to a digital bandpass filter allowing the passage of only an input signal of a frequency of for example 5 kHz to 20 kHz or so. The strength of the knocking is judged based on the output values of the pressure sensor 19 after filtering by this digital bandpass filter. Note that, the output values of the knocking sensor 18 after filtering by the digital bandpass filter in this way will be referred to below as simply the "output values of the knocking sensor 18 after filtering" while the output values of the pressure sensor 19 after filtering by the digital bandpass filter will be referred to below as simply the "output values of the pressure sensor 19 after filtering".

Figure 6A:
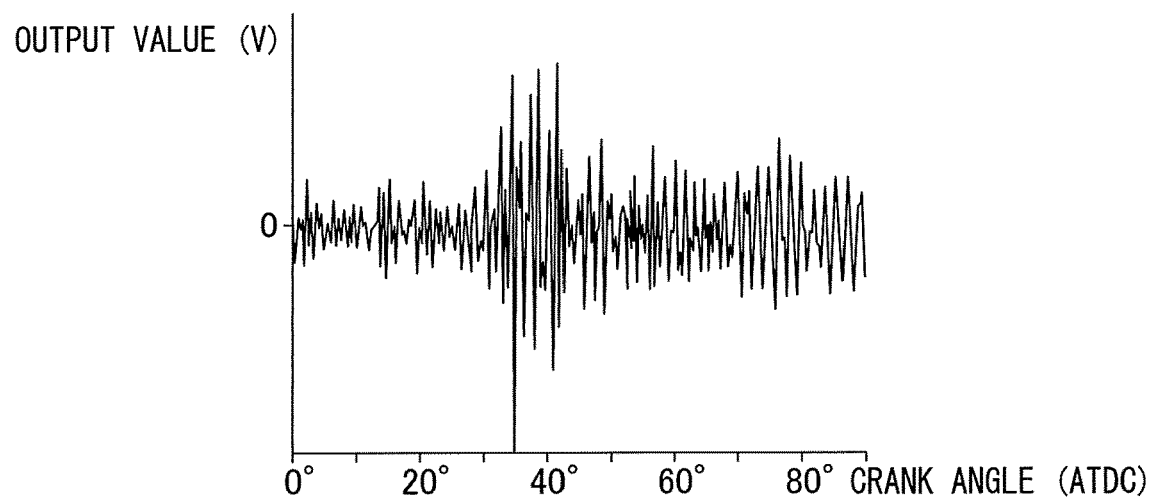
FIG. 6A, FIG. 6B, and FIG. 6C are views showing output values of a knocking sensor.
Figure 7A:
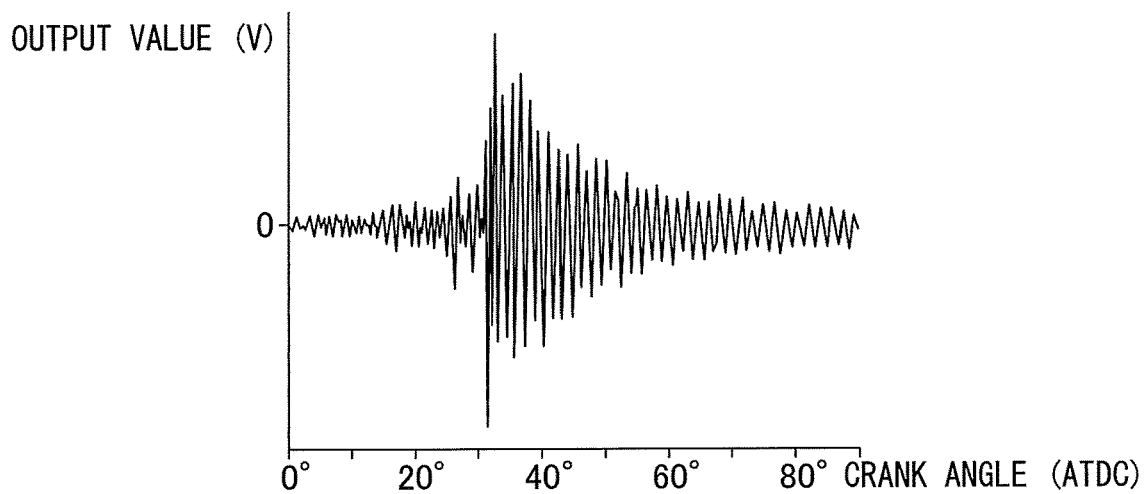
FIG. 7A, FIG. 7B, and FIG. 7C are views showing output values of a pressure sensor.

FIG. 6A and FIG. 7A respectively show the change (V) of the output values of the knocking sensor 18 after filtering and the change (V) of the output values of the pressure sensor 19 after filtering for the same knocking. Note that, the ordinate of FIG. 6A and the abscissa of FIG. 7A show the crank angle expressed by ATDC (from compression top dead center to 90° after compression top dead center).

As will be understood by a comparison of FIG. 6A and FIG. 7A, the strength of vibration of the output values of the pressure sensor 19 after filtering shown in FIG. 7A rapidly increases if knocking occurs, then gradually decreases. That is, the output values of the pressure sensor 19 are not affected by vibration of the engine body due to mechanical operations, so the occurrence of knocking clearly appears in the output values of the pressure sensor 19. As opposed to this, the strength of vibration of the output values of the knocking sensor 18 after filtering shown in FIG. 6A also increases if knocking occurs, but the output values of the knocking sensor 18 are greatly affected by vibration of the engine body due to mechanical operations, so the strength of vibration of the output values of the knocking sensor 18 becomes a large value before and after the occurrence of knocking. That is, vibration of the engine body due to mechanical operations appears as noise in the output values of the knocking sensor 18, so the occurrence of knocking no longer clearly appears in the output values of the knocking sensor 18.

Figure 7B:
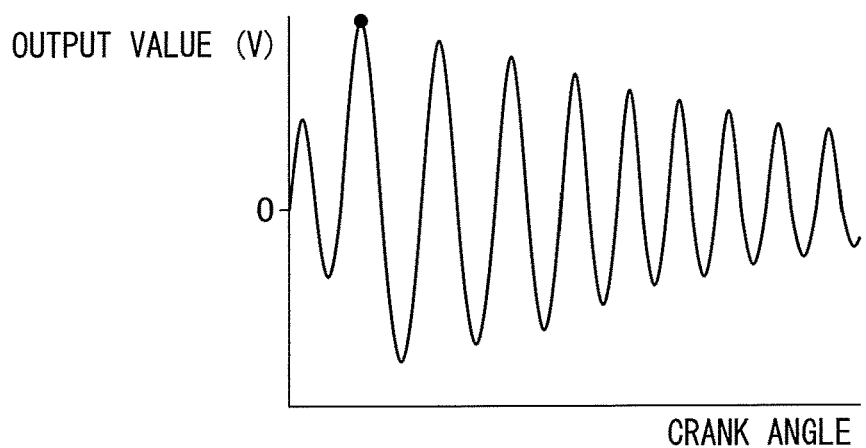
Figure 7C:
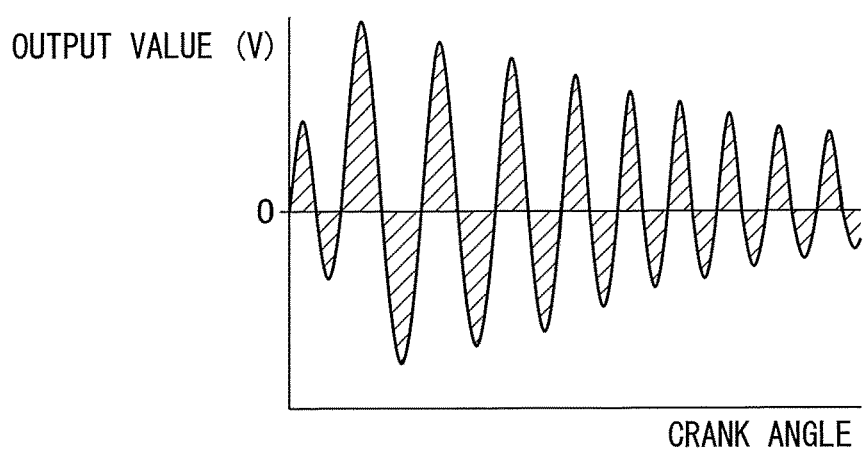

Therefore, whether knocking has occurred can be clearly judged from the output values of the pressure sensor 19. In this case, the strength of the knocking occurring also clearly appears in the output values of the pressure sensor 19. Next, this will be explained while referring to FIG. 7B and FIG. 7C. Note that, FIG. 7B and FIG. 7C are views schematically showing part of the waveform of the output values of the pressure sensor 19 after filtering shown in FIG. 7A stretched in the abscissa direction.

Now then, if the strength of the knocking caused becomes higher, the peak value of the output values of the pressure sensor 19 after filtering becomes higher. Therefore, the peak value of the output values of the pressure sensor 19 after filtering shown by the dot in FIG. 7B shows a value representing the knocking strength. On the other hand, if the strength of the knocking caused becomes higher, in FIG. 7C, the sum of the areas shown by hatching surrounded by the waveform of the output values and the line of output values of 0 (V), that is, the integral value of the output values of the pressure sensor 19 after filtering (negative integral values also made positive values), becomes higher. Therefore, the integral value of the output values of the pressure sensor 19 after the filtering (negative side integral values also made positive values) also shows a value representing the knocking strength. In this way, a value representing the knocking strength can be acquired from the output values of the pressure sensor 19.

On the other hand, it is difficult to extract such a value representing the knocking strength from the output values of the knocking sensor 18. Therefore, in the present invention, a neural network is used and the weights of the neural network are learned so that a value representing the knocking strength found from the output values of the pressure sensor 19 can be acquired based on the output values of the knocking sensor 18. Due to this, by using the learned neural network, a value representing the knocking strength found from the output values of the pressure sensor 19 is estimated from the output values of the knocking sensor 18. Therefore, next, the method of learning the weights of the neural network for being able to acquire a value representing the knocking strength found from the output values of the pressure sensor 19 based on the output values of the knocking sensor 18 will be explained.

First, the neural network used at this time will be explained while referring to FIG. 8. If referring to FIG. 8, in this neural network 20 as well, in the same way as the neural network shown in FIG. 3, L=1 shows an input layer, L=2 and L=3 show hidden layers, and L=4 shows an output layer. As will be understood from FIG. 8, the input layer (L=1) is comprised of "n" number of nodes. "n" number of input values $x_1, x_2 \ldots x_{n-1}, x_n$ are input to the nodes of the input layer (L=1). On the other hand, FIG. 8 describes the hidden layer (L=2) and hidden layer (L=3), but the number of hidden layers can be made one or more layers. Further, the numbers of nodes of the hidden layers can also be made any numbers. Note that, the number of nodes of the output layer (L=4) is made a single node. The output values from the node of the output layer are shown by "y".

Figure 6B:
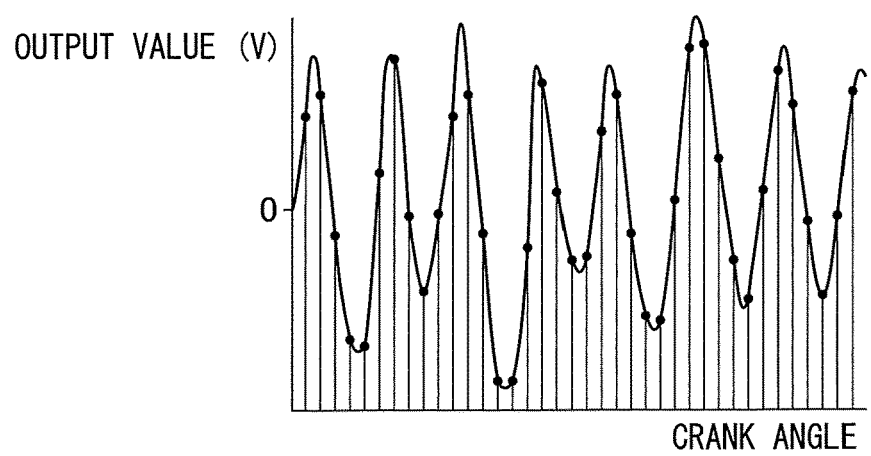
Figure 6C:
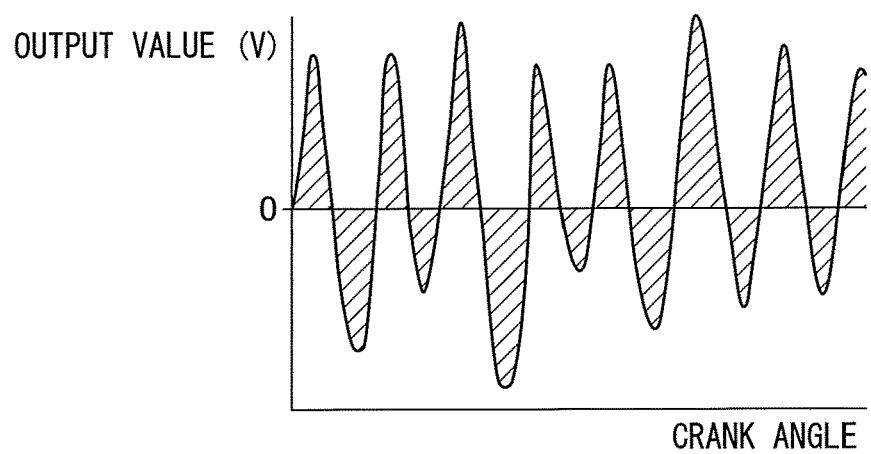

Next, the input values $x_1, x_2 \ldots x_{n-1}, x_n$ and the output values "y" in FIG. 8 will be explained. First, the input values $x_1, x_2 \ldots x_{n-1}, x_n$ will be explained while referring to FIG. 6B and FIG. 6C. Note that, FIG. 6B and FIG. 6C are views schematically showing part of the waveform of the output values of the knocking sensor 18 shown in FIG. 6A stretched in the abscissa direction. In the embodiment according to the present invention, as the input values $x_1, x_2 \ldots x_{n-1}, x_n$, the values shown in FIG. 6B or the values shown in FIG. 6C are used.

That is, in the example shown in FIG. 6B, the output values of the knocking sensor 18 after filtering themselves are made the input values $x_1, x_2 \ldots x_{n-1}, x_n$. In this case, as shown by the dots in FIG. 6B, the output values of the knocking sensor 18 for each certain time or for each certain crank angle are made the input values $x_1, x_2 \ldots x_{n-1}, x_n$. On the other hand, in the example shown in FIG. 6C, integral values of the output values of the knocking sensor 18 after filtering (negative side integral values also made positive values), for example, integral values of the output values of the knocking sensor 18 after filtering within certain crank angles, are made the input values $x_1, x_2 \ldots x_{n-1}, x_n$.

Figure 8:
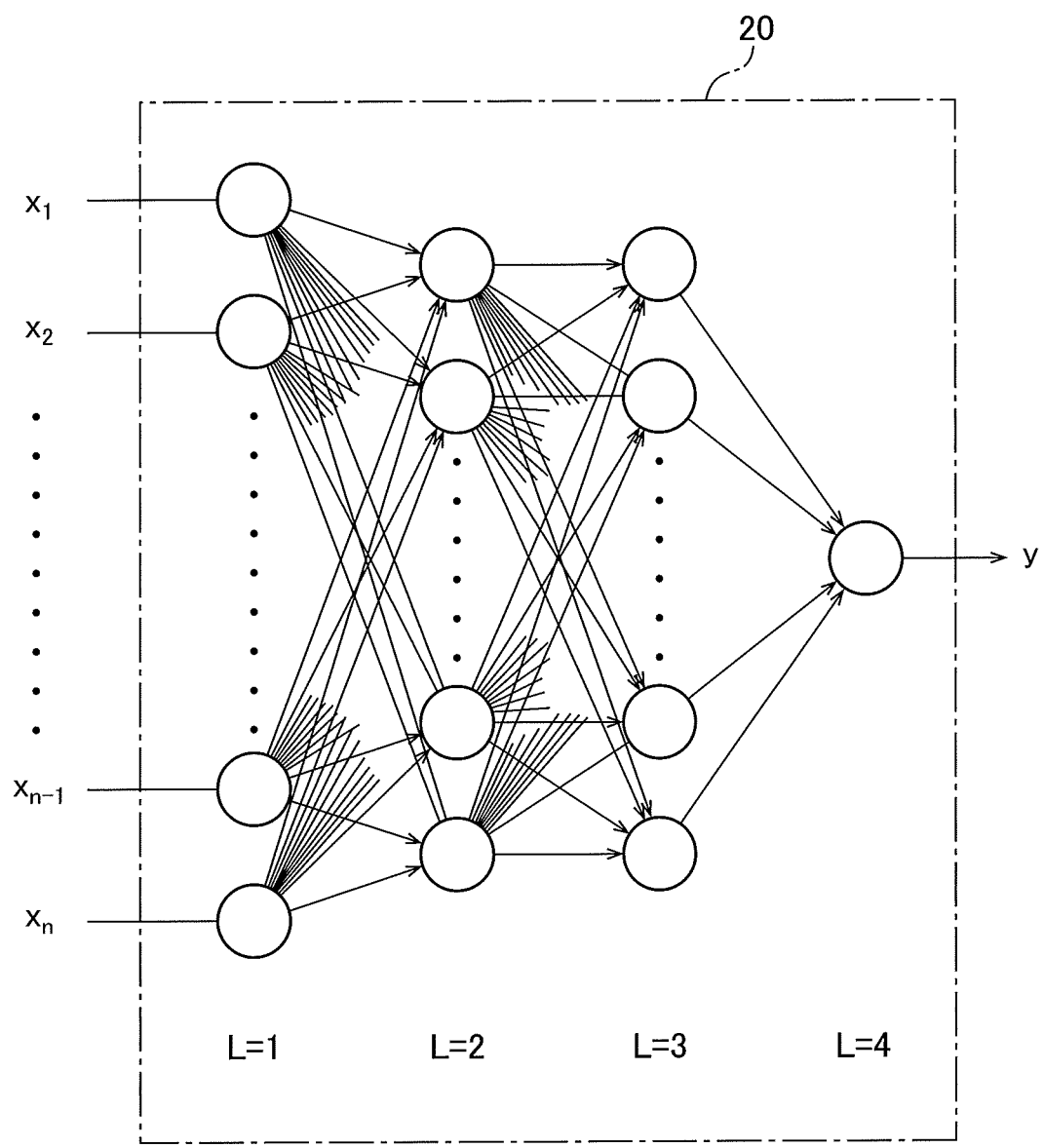
FIG. 8 is a view showing a neural network used in an embodiment according to the present invention.

On the other hand, in the embodiment of the present invention, a value representing the knocking strength found from the output values of the pressure sensor 19 is made the output value "y" shown in FIG. 8. In this case, the peak value of the output values of the pressure sensor 19 shown by the dot in FIG. 7B expresses the knocking strength. Further, the integral value of the output values of the pressure sensor 19 shown in FIG. 7C (negative side integral values also made positive values) also expresses the knocking strength. Therefore, in the embodiment of the present invention, the peak value of the output values of the pressure sensor 19 shown by the dot in FIG. 7B is made the output value "y" or the integral value of the output values of the pressure sensor 19 shown in FIG. 7C (negative side integral values also made positive values) is made the output value "y". In this case, the measured value of the value representing the knocking strength found from the output values of the pressure sensor 19 is made the training data yt.

FIG. 9 shows a training data set prepared using the input values $x_1, x_2 \ldots x_{m-1}, x_m$ and the measured values of the value representing the knocking strength found from the output values of the pressure sensor 19 when the input values are $x_1, x_2 \ldots x_{m-1}, x_m$, that is, the training data yt. As shown in FIG. 9, in this training data set, "m" number of data showing the relationship between the input values $x_1, x_2 \ldots x_{n-1}, x_n$ and the training data yt are acquired. For example, in the second data (No. 2), the acquired input values $x_{12}, x_{22} \ldots x_{m-12}, x_{m2}$ and training data $yt_2$ are listed, while in the m−1th data (No. m−1), the input values $x_{1m-1}, x_{2m-1} \ldots x_{n-1m-1}, x_{nm-1}$ of the acquired input parameters and the training data $yt_{m-1}$ are listed.

When using the output values of the knocking sensor 18 after filtering as they are as the input values $x_1, x_2 \ldots x_{n-1}, x_n$, for example, the output values of the knocking sensor 18 after filtering acquired for each certain crank angle in the period from compression top dead center to 90° after compression top dead center are made the input values $x_1, x_2 \ldots x_{n-1}, x_n$. In this case, the number "n" of input values is made several hundred values or more. Therefore, the number "n" of nodes of the input layer (L=1) shown in FIG. 8 is made several hundred nodes or more.

On the other hand, in the embodiment of the present invention, if using the integral values of the output values of the knocking sensor 18 after filtering (negative side integral values also made positive values) as the input values $x_1, x_2 \ldots x_{n-1}, x_n$, the period from compression top dead center to 90° after compression top dead center is divided into 18 sections for each crank angle 5°. The integral values of the output values of the knocking sensor 18 after filtering in the individual divided sections (negative side integral values also made positive values) are made the input values $x_1, x_2 \ldots x_{n-1}, x_n$. In this case, the number "n" of input values becomes 18 values. Therefore, the number "n" of nodes of the input layer (L=1) shown in FIG. 8 is made 18 nodes.

On the other hand, the training data yt in the training data set shown in FIG. 9 is the measured value of the value representing the knocking strength found from the output values of the pressure sensor 19. As this training data yt, the peak value of the output values of the pressure sensor 19 shown by the dot in FIG. 7B is used or the integral value of the output values of the pressure sensor 19 shown in FIG. 7C (negative side integral values also made positive values) is used. In this regard, in the embodiment according to the present invention, the training data set shown in FIG. 9 is used to learn the weights of the neural network 20 shown in FIG. 8. Therefore, next, the method of preparation of the training data set shown in FIG. 9 will be explained.

FIG. 4 and FIG. 5 show one example of the method of preparation of the training data set. Referring to FIG. 4 and FIG. 5, the pressure sensor 19 is placed on the inside wall surface of the cylinder head 3 facing the combustion chamber 5 of each cylinder to acquire the value representing the knocking strength. If the data required for learning finishes being acquired, these pressure sensors 19 are detached from the cylinder head 3 and the holes in which the pressure sensors 19 were inserted are closed. Now then, in the example shown in FIG. 5, the knocking sensor 18 is connected to a detector 21 able to detect the waveform of the output values of the knocking sensor 18, for example, an oscilloscope. Each pressure sensor 19 is connected to a detector 22 able to detect the waveform of the output values of each pressure sensor 19, for example, an oscilloscope.

Inside the detector 21, to extract only the vibration of the engine body 1 due to knocking, the output values of the knocking sensor 18 are converted from an analog to digital form, then are sent to a digital bandpass filter allowing passage of only an input signal of a frequency of for example 5 kHz to 20 kHz or so. The waveform of the output values of the knocking sensor 18 after filtering by this digital bandpass filter is detected. On the other hand, in the detector 22, to extract only the pressure fluctuation in the combustion chambers 5 due to knocking, the output values of the pressure sensors 19 are converted from an analog to digital form, then are sent to a digital bandpass filter allowing passage of only an input signal of a frequency of for example 5 kHz to 20 kHz or so. The waveforms of the output values of the pressure sensors 19 after filtering by this digital bandpass filter are detected.

When preparing the training data set, the engine is operated so that both states of operating states where knocking does not occur and operating states where knocking does occur are caused for various combinations of engine load and engine speed. A training data set such as shown in FIG. 9 is prepared based on the waveform data of the output values of the pressure sensors 19 after filtering and the waveform data of the output values of the pressure sensors 19 after filtering obtained from the detectors 21 and 22 at this time. In this case, this training data set can be prepared by manual work based on the waveform data obtained from the detectors 21 and 22 and can be prepared electronically based on the electronic data obtained from the detectors 21 and 22. The electronic data of the training data set prepared in this way is used to learn the weights of the neural network 20 shown in FIG. 8.

In the example shown in FIG. 5, a learning device 23 for learning the weights of the neural network is provided. As shown in FIG. 5, this learning device 23 is provided with a storage device 24, that is, memory 24, and CPU (microprocessor) 25. In the example shown in FIG. 5, the numbers of nodes of the neural network 20 shown in FIG. 8 and the electronic data of the prepared training data set are stored in the memory 24 of the learning device 23. In the CPU 25, the weights of the neural network 20 are learned. In this case, the weights of the neural network 20 can also be learned by the electronic control unit 30 shown in FIG. 1. In this case, the numbers of nodes of the neural network 20 shown in FIG. 8 and the electronic data of the prepared training data set are stored in the memory 32 of the electronic control unit 30 while the weights of the neural network 20 are learned in the CPU 33. In this case, the electronic control unit 30 forms a learning device.

Next, the case of using the integral values of the output values of the knocking sensor 18 after filtering in the sections divided for each crank angle 5° from top dead center to 90° after top dead center as the input values $x_1, x_2 \ldots x_{n-1}, x_n$ (negative side integral values also made positive values), using the measured values of the peak values of the output values of the pressure sensors 19 as the training data yt, and using the learning device 23 shown in FIG. 5 will be used as an example to explain the case of learning the weights of the neural network 20.

Figure 10:
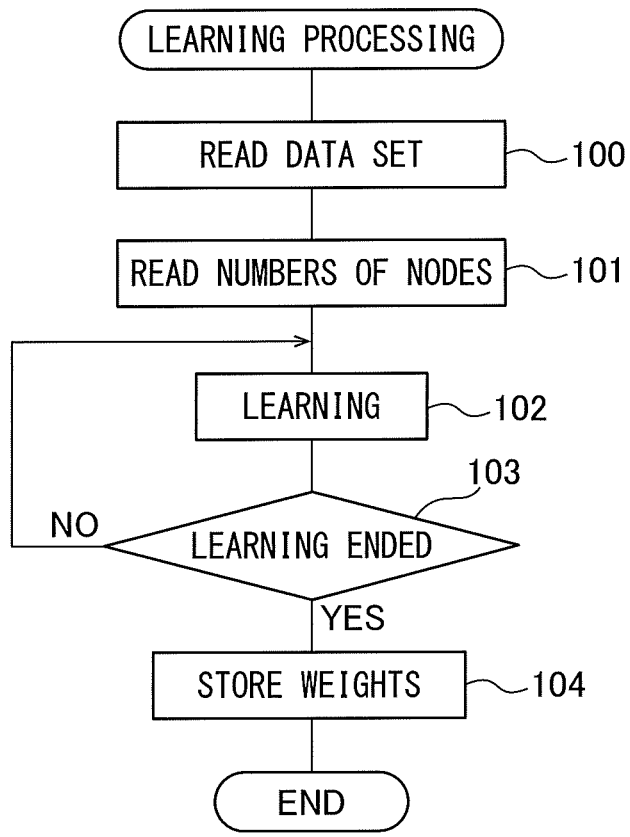
FIG. 10 is a flow chart showing a learning processing routine.

FIG. 10 shows a learning processing routine of weights of the neural network performed in the learning device 23. Referring to FIG. 10, first, at step 100, the data of the training data set stored in the memory 24 of the learning device 23 is read. Next, at step 101, the number of nodes of the input layer (L=1) of the neural network 20, the numbers of nodes of the hidden layer (L=2) and hidden layer (L=3), and the number of nodes of the output layer (L=4) are read. Based on these numbers of nodes, the neural network 20 such as shown in FIG. 8 is prepared. In this case, in this example, the number of nodes of the input layer (L=1) is made 18 and the number of nodes of the output layer (L=4) is made 1.

Next, at step 102, the weights of the neural network 20 are learned. First, the first (No. 1) input values $x_1, x_2 \ldots x_{n-1}, x_n$ of FIG. 9, that is, the input values $x_1, x_2 \ldots x_{17}, x_{18}$, are input into the 18 nodes of the input layer (L=1) of the neural network 20. Next, the square error $E=\frac{1}{2}(y-y_{t1})^2$ between the output values "y" of the neural network 20 at this time and the first (No. 1) training data $yt_1$ is calculated, and the weights of the neural network 20 are learned so that this square error E becomes smaller by using the above-mentioned error backpropagation algorithm.

If the weights of the neural network 20 based on the first (No. 1) data of FIG. 9 finish being learned, next, the weights of the neural network 20 based on the second (No. 2) data of FIG. 9 are learned using the error backpropagation algorithm. Similarly, the weights of the neural network 20 are successively learned up to the m th (No. m) data of FIG. 9. If the weights of the neural network 20 finish being learned for all of the first (No. 1) data to the m th (No. m) data of FIG. 9, the routine proceeds to step 103.

At step 103, for example, the square sum error E between the output value "y" of the neural network and the training data yt of all of the first (No. 1) to the m th (No. m) of FIG. 9 is calculated and it is judged if this square sum error E becomes a preset set error or less. When it is judged that the square sum error E becomes the preset set error or less, the routine proceeds to step 104 where the learned weights of the neural network 20 are stored in the memory 24 of the learning device 23. Next, the learning routine is ended. As opposed to this, when it is judged that the square sum error E does not become the preset set error or less, the routine returns to step 102 where the weights of the neural network are again learned based on the training data set shown in FIG. 9. Next, the weights of the neural network continue being learned until the square sum error E becomes the preset set error or less.

As explained above, the weights of the neural network can be learned in the electronic control unit 30 as well. In this case, the learning processing routine of the weights of the neural network shown in FIG. 10 is performed in the electronic control unit 30 and the learned weights of the neural network 20 are stored in the memory 32 of the electronic control unit 30. On the other hand, when the weights of the neural network are learned in the learning device 23, the learned weights of the neural network 20 acquired at the learning device 23 are used to prepare the neural network in the electronic control unit 30 by using the data read routine shown in FIG. 11 performed in the electronic control unit 30.

Figure 11:
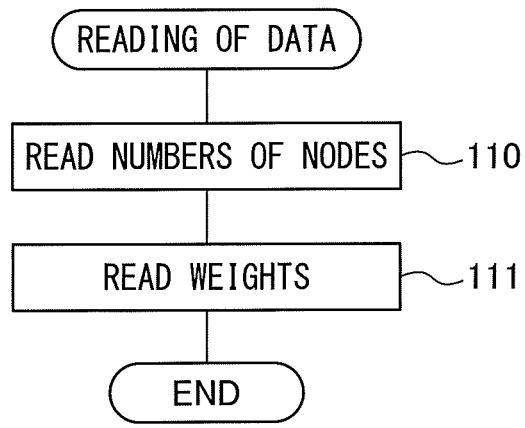
FIG. 11 is a flow chart showing a data reading routine.

That is, as shown in FIG. 11, at step 110, the number of nodes of the input layer (L=1) of the neural network 20, the numbers of nodes of the hidden layer (L=2) and hidden layer (L=3), and the number of nodes of the output layer (L=4) are read. Next, at step 111, the learned weights of the neural network 20 acquired at the learning device 23 are stored in the memory 32 of the electronic control unit 30. Based on these numbers of nodes and learned weights, the learned neural network 20 is prepared in the electronic control unit 30.

Now, if the learned neural network 20 is prepared in the electronic control unit 30, when inputting the integral values of the output values of the knocking sensor 18 after filtering in the sections divided for each crank angle 5° (negative side integral values also made positive values) in this learned neural network 20, an estimated value of the value representing the knocking strength found from the output values of the pressure sensor 19 is output from the neural network 20. This estimated value of the value representing the knocking strength is extremely close to the measured value of the value representing the knocking strength. Therefore, it becomes possible to accurately estimate the knocking strength from the output values of the knocking sensor 18.

In this way, in the embodiment according to the present invention, the knocking sensor 18 detecting vibration of the engine body 1, the pressure sensor 19 detecting pressure inside the combustion chamber 5 of the internal combustion engine, and the learning device 23 for estimating a value representing the knocking strength of the internal combustion engine using the neural network 20 (the electronic control unit 30 is included in this learning device 23) are provided. A value representing the knocking strength is acquired from the output values of the pressure sensor 19. In the learning device 23, the weights of the neural network 20 are learned using the value representing vibration of the engine body 1 detected by the knocking sensor 18 as an input value of the neural network 20 and using the acquired value representing the knocking strength as the training data. The value representing the knocking strength is estimated from the output values of the knocking sensor 18 by using the learned neural network 20.

Further, in the embodiment according to the present invention, the knocking strength of the internal combustion engine is estimated by using the neural network 20 based on the output values of the knocking sensor 18 detecting vibration of the engine body 1 and the output values of the pressure sensor 19 detecting the pressure inside the combustion chamber 5 of the internal combustion engine. The value representing the knocking strength is found from the output values of the pressure sensor 19 and the training data set showing the relationship between the value representing vibration of the engine body 1 detected by the knocking sensor 18 and the value representing the knocking strength is prepared. The weights of the neural network 20 are learned using the value representing the vibration of the engine body 1 detected by the knocking sensor 18 as an input value of the neural network 20 and using the acquired value representing the knocking strength as training data. The value representing the knocking strength is estimated from the output values of the knocking sensor 18 by using the learned neural network 20.

In this case, in the embodiment according to the present invention, the value representing the knocking strength is the peak value of the output values of the pressure sensor 19 in the preset time period or the value representing the knocking strength is the integral value of the output values of the pressure sensor 19 in the preset time period. In this case, the preset time period is a certain range of crank angle, for example, a range from compression top dead center to 90° after compression top dead center.

On the other hand, in the embodiment according to the present invention, the value representing the vibration of the engine body 1 is an output value of the knocking sensor 18 in the preset time period, or the value representing the vibration of the engine body 1 is an integral value of the output values of the knocking sensor 18 in a section equally divided in the preset time period. In this case, the preset time period is a certain range of crank angle, for example, a range of compression top dead center to 90° after compression top dead center. Further, regarding an integral value of the output values of the knocking sensor 18, if giving one example, the integral value of the output values of the knocking sensor 18 is the integral value of the output values of the knocking sensor 18 after filtering in the sections equally divided for each crank angle 5° (negative side integral values also made positive values).

Figure 12:
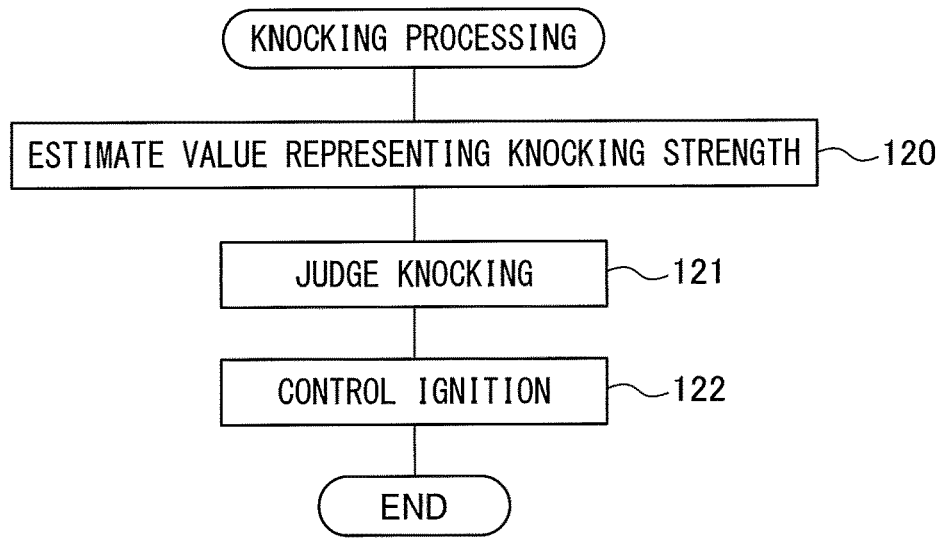
FIG. 12 is a flow chart showing a knocking processing routine.

As explained above, inside the memory 32 of the electronic control unit 30 shown in FIG. 1, the learned weight coefficients of the neural network 20 are stored. That is, in the electronic control unit 30 shown in FIG. 1, the learned neural network 20 is formed. FIG. 12 shows the knocking processing routine performed at the time of vehicle operation in the electronic control unit 30 using the learned neural network 20. As shown in FIG. 12, if this knocking processing routine is performed, first, at step 120, processing for estimating a value representing the knocking strength found from the output values of the pressure sensor 19, that is, a knocking strength representative value, is performed. Next, at step 121, knocking judging processing for judging if knocking occurs is performed. Next, at step 122, ignition control is performed.

Figure 13:
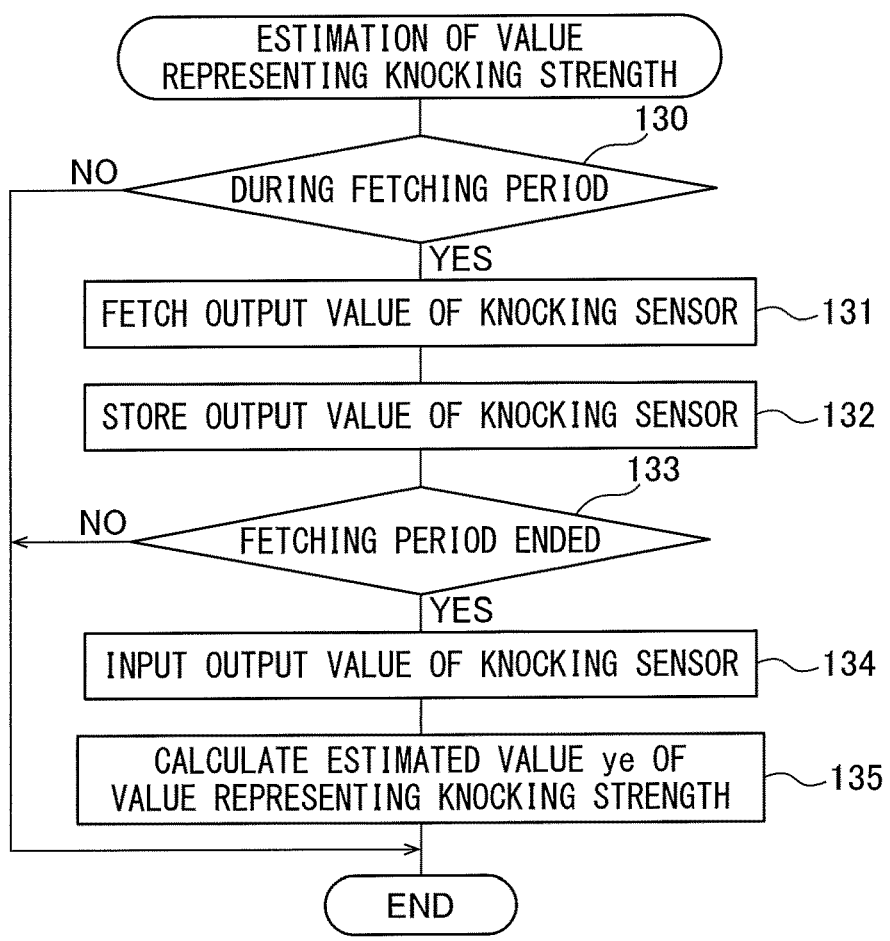
FIG. 13 is a flow chart showing a routine for estimation of a value representing the knocking strength.

FIG. 13 shows an embodiment of the estimation processing routine of the value representing the knocking strength performed at step 120 of FIG. 12. This routine is performed by interruption every fixed crank angle or every fixed time. If referring to FIG. 13, first, at step 130 it is judged if the time period is one for fetching the output signals of the knocking sensor 18. In this embodiment, the time period for fetching the output signals of the knocking sensor 18 is made the period from compression top dead center to 90° after compression top dead center. Therefore, when the crank angle is before compression top dead center, the processing cycle is ended, while when the crank angle exceeds compression top dead center, it is judged that the time period is one for fetching the output signals of the knocking sensor 18 and the routine proceeds to step 131.

At step 131, the output signals of the knocking sensor 18 are fetched through the corresponding AD converter 36 and the digital bandpass filter 37 allowing passage of only an input signal of a frequency of for example 5 kHz to 20 kHz or so. That is, the output values of the knocking sensor 18 after filtering are fetched. Next, at step 132, the fetched output values of the knocking sensor 18 after filtering are stored in the memory 32 of the electronic control unit 30. Next, at step 133, it is judged if the period for fetching the output signals of the knocking sensor 18 has ended. That is, it is judged if the crank angle has reached 90° after compression top dead center. When at step 133 it is judged that the period for fetching the output signals of the knocking sensor 18 has not ended, that is, when it is judged that the crank angle has not reached 90° after compression top dead center, the processing cycle is ended.

As opposed to this, when at step 133 it is judged that the period for fetching the output signals of the knocking sensor 18 has ended, that is, when it is judged that the crank angle has reached 90° after compression top dead center, the routine proceeds to step 134. At this time, in the memory 32, the output values of the knocking sensor 18 after filtering such as shown by the dots of FIG. 6B have been stored. At step 134, the output values of the knocking sensor 18 after filtering stored in this memory 32 are input to the nodes of the input layer (L=1) of the learned neural network 20. At this time, the estimated value ye of the value representing the knocking strength is output from the learned neural network 20. Therefore, as shown in step 135, the estimated value ye of the value representing the knocking strength is calculated.

Figure 14:
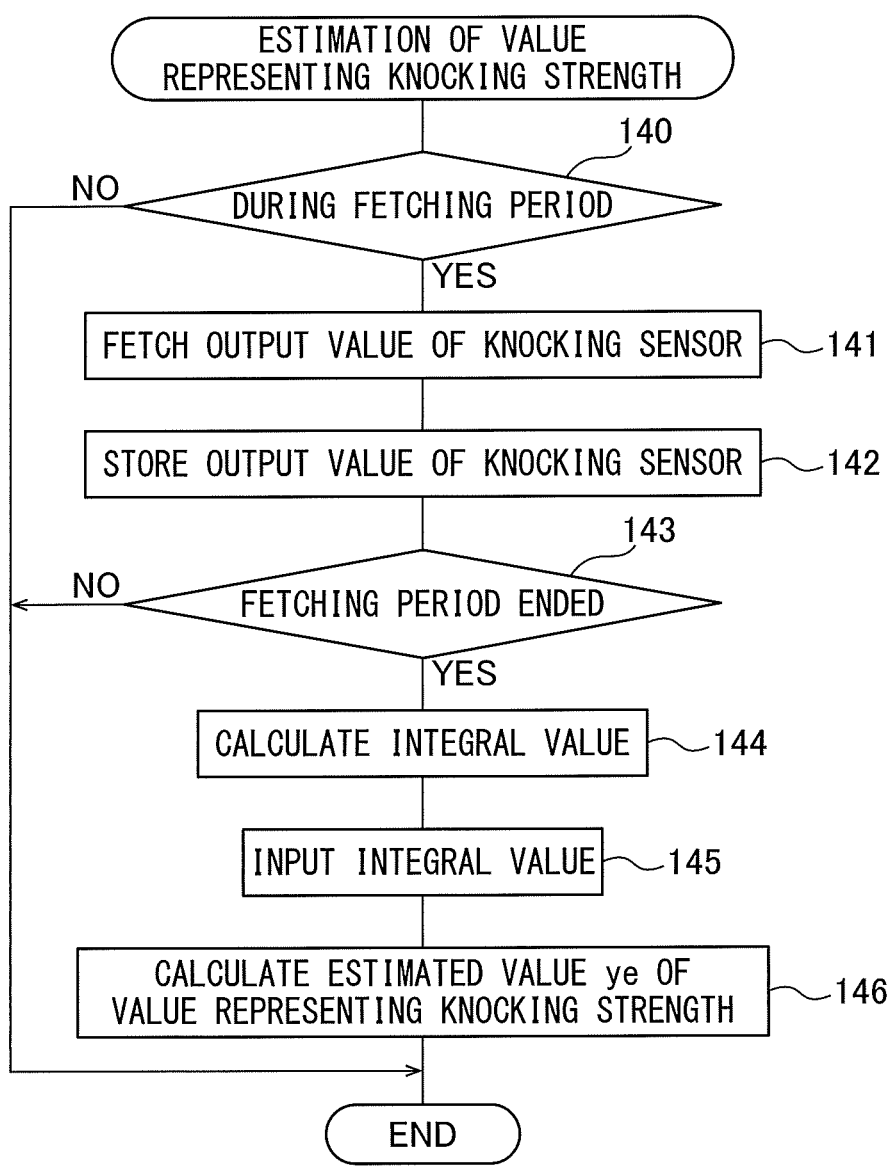
FIG. 14 is a flow chart showing another embodiment of a routine for estimation of a value representing the knocking strength.

FIG. 14 shows another embodiment of the estimation processing routine of the value representing the knocking strength performed at step 120 of FIG. 12. This routine is also performed by interruption every fixed crank angle or every fixed time. Note that, the content from step 140 to step 143 of FIG. 14 is the same as the content from step 130 to step 133 of FIG. 13. That is, if referring to FIG. 14, first, at step 140 it is judged if the time period is one for fetching the output signals of the knocking sensor 18. In this embodiment, the time period for fetching the output signals of the knocking sensor 18 is made the period from compression top dead center to 90° after compression top dead center. Therefore, when the crank angle is before compression top dead center, the processing cycle is ended, while when the crank angle exceeds compression top dead center, it is judged that the time period is one for fetching the output signals of the knocking sensor 18 and the routine proceeds to step 141.

At step 141, the output signals of the knocking sensor 18 are fetched through the corresponding AD converter 36 and the digital bandpass filter 37 allowing passage of only an input signal of a frequency of for example 5 kHz to 20 kHz or so. That is, the output values of the knocking sensor 18 after filtering are fetched. Next, at step 142, the fetched output values of the knocking sensor 18 after filtering are stored in the memory 32 of the electronic control unit 30. Next, at step 143, it is judged if the period for fetching the output signals of the knocking sensor 18 has ended. That is, it is judged if the crank angle has reached 90° after compression top dead center. When at step 143 it is judged that the period for fetching the output signals of the knocking sensor 18 has not ended, that is, when it is judged that the crank angle has not reached 90° after compression top dead center, the processing cycle is ended.

As opposed to this, when at step 143 it is judged that the period for fetching the output signals of the knocking sensor 18 has ended, that is, when it is judged that the crank angle has reached 90° after compression top dead center, the routine proceeds to step 144. At step 144, based on the output values of the knocking sensor 18 after filtering stored in the memory 32, as explained while referring to FIG. 6C, the integral values of the output values of the knocking sensor 18 after filtering in the sections divided for each crank angle 5° (negative side integral values also made positive values) are calculated. Next, at step 145, the calculated integral values of the output values of the knocking sensor 18 after filtering are input to the nodes of the input layer (L=1) of the learned neural network 20. At this time, the estimated value ye of the value representing the knocking strength is output from the learned neural network 20. Therefore, as shown in step 146, the estimated value ye of the value representing the knocking strength is calculated.

Figure 15:
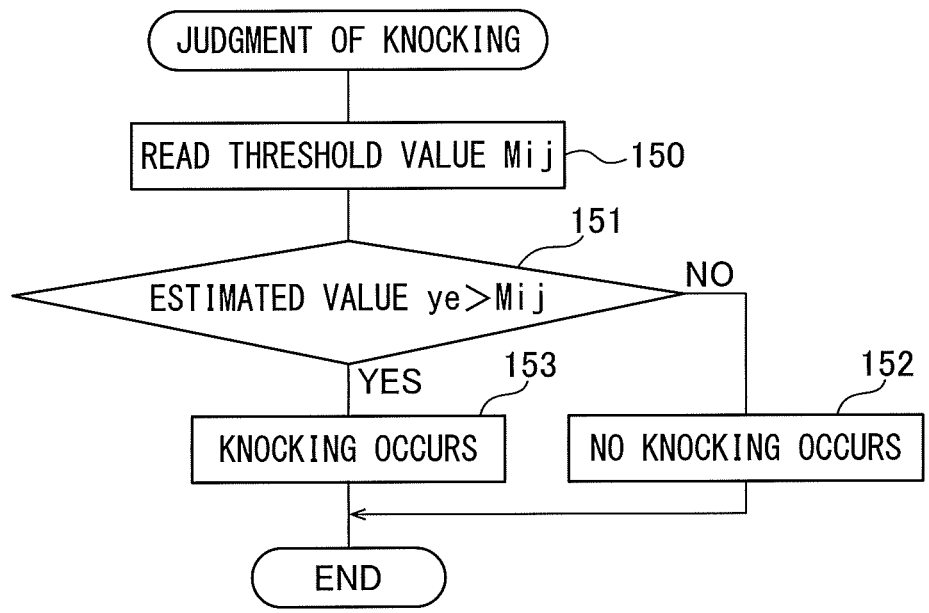
FIG. 15 is a flow chart showing a knocking judgment routine.
Figure 16:
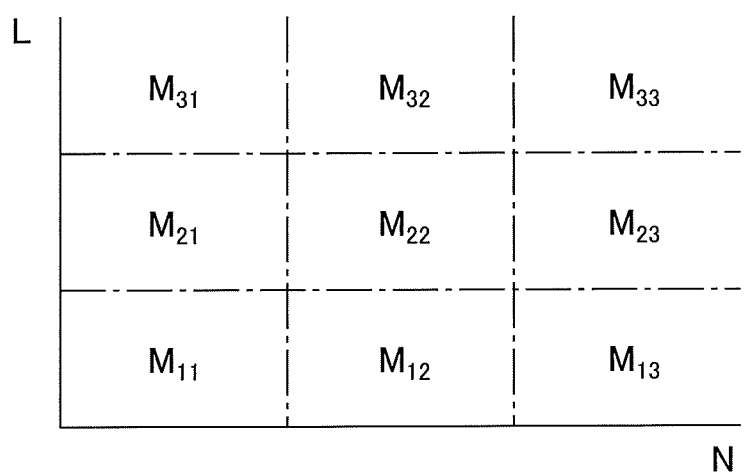
FIG. 16 is a view showing a threshold value Mij.

FIG. 15 shows a knocking judgment routine performed in the electronic control unit 30 based on the estimated value ye of the value representing the knocking strength calculated at step 135 of FIG. 13 or the estimated value ye of the value representing the knocking strength calculated at step 146 of FIG. 14. This routine is performed by interruption every fixed crank angle. Referring to FIG. 15, first, at step 150, a threshold value Mij for the value representing the knocking strength is read. This threshold value Mij, as shown in FIG. 16, is preset for engine operating regions divided in accordance with the engine load L and the engine speed N.

Next, at step 151, it is judged if the estimated value ye of the value representing the knocking strength calculated is larger than the threshold value Mij. If it is judged that the estimated value ye of the value representing the knocking strength calculated is not larger than the threshold value Mij, the routine proceeds to step 152 where it is judged that knocking is not occurring, then the processing cycle is ended. As opposed to this, when it is judged that the estimated value ye of the value representing the knocking strength calculated is larger than the threshold value Mij, the routine proceeds to step 153 where it is judged that knocking is occurring then the processing cycle is ended.

Figure 17:
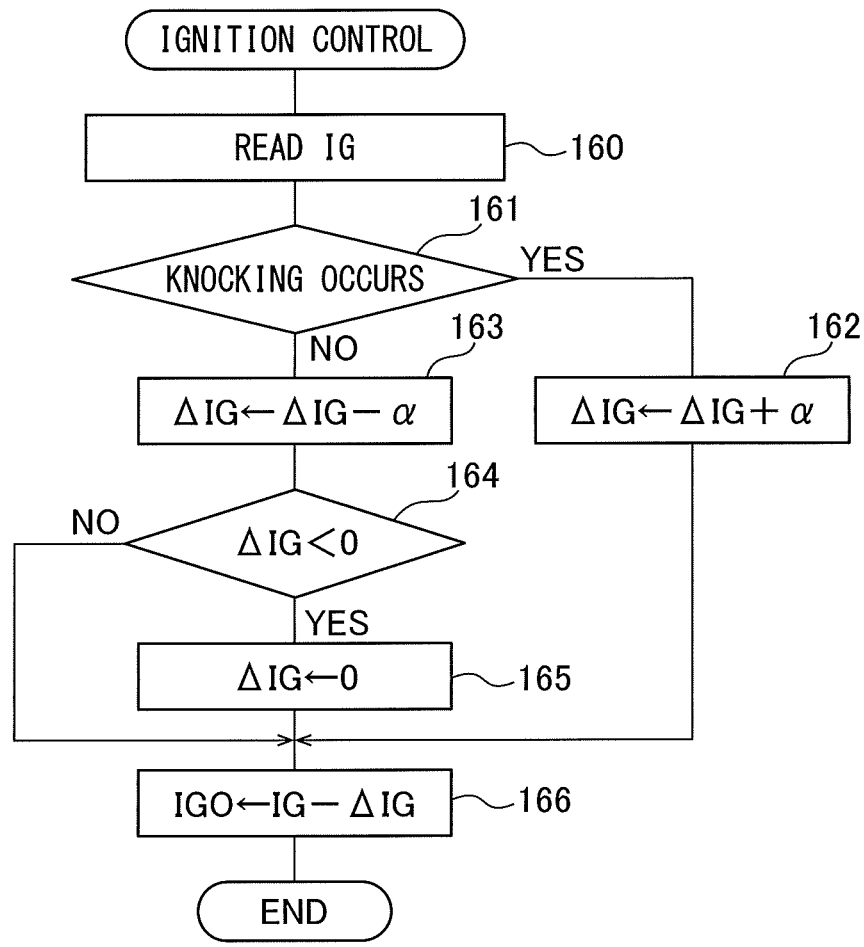
FIG. 17 is a flow chart showing an ignition control routine.
Figure 18:
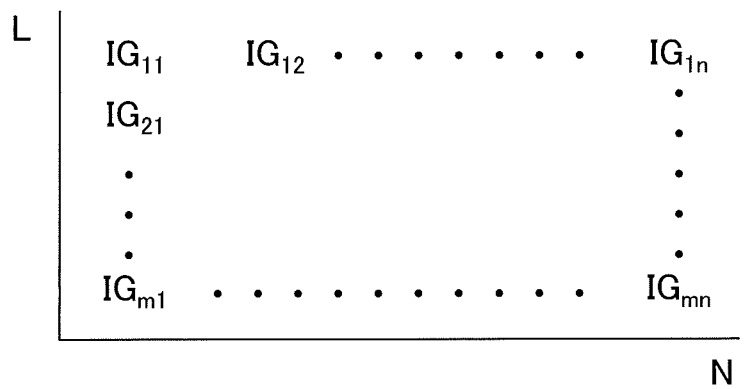
FIG. 18 is a view showing a map of a reference ignition timing.

FIG. 17 shows an ignition control routine performed in the electronic control unit 30 based on the results of judgment at the knocking judgment routine shown in FIG. 15. This routine is performed by interruption every fixed crank angle. Referring to FIG. 17, first, at step 160, a reference ignition timing IG (BTDC) is calculated. This reference ignition timing IG is stored as a function of the engine load L and the engine speed N in the form of a map such as shown in FIG. 18 in advance in the memory 32. Next, at step 161 it is judged if knocking has occurred based on the results of judgment at the knocking judgment routine shown in FIG. 15. When it is judged that knocking has occurred, the routine proceeds to step 162.

At step 162, to delay the ignition timing, a fixed amount α is added to the amount of ignition timing delay ΔIG. Next, at step 166, the amount of ignition timing delay ΔIG is subtracted from the reference ignition timing IG to thereby calculate the final ignition timing IGO. The ignition action by the spark plug 11 is controlled based on this final ignition timing IGO. At this time, the ignition timing is delayed. On the other hand, when at step 161 it is judged that knocking has not occurred, the routine proceeds to step 163 where the fixed amount α is subtracted from the amount of ignition timing delay ΔIG to advance the ignition timing. Next, at step 164, it is judged if the amount of the amount of ignition timing delay ΔIG has become negative. When the amount of ignition timing delay ΔIG becomes negative, the routine proceeds to step 165 where the amount of ignition timing delay ΔIG is made zero, then the routine proceeds to step 166.

Now then, as explained above, knocking usually occurs from top dead center to 90° after top dead center. Therefore, in the embodiments explained above, the occurrence of knocking is detected based on the output values of the knocking sensor 18 and the output values of the pressure sensor 19 fetched from top dead center to 90° after top dead center. However, vibration of the engine body 1 due to knocking does not depend on the engine speed, but tends to occur a fixed time after compression top dead center. If considering such a tendency, it may be considered to detect the occurrence of knocking based on the output values of the knocking sensor 18 and the output values of the pressure sensor 19 fetched during a fixed time after compression top dead center.

Figure 19:
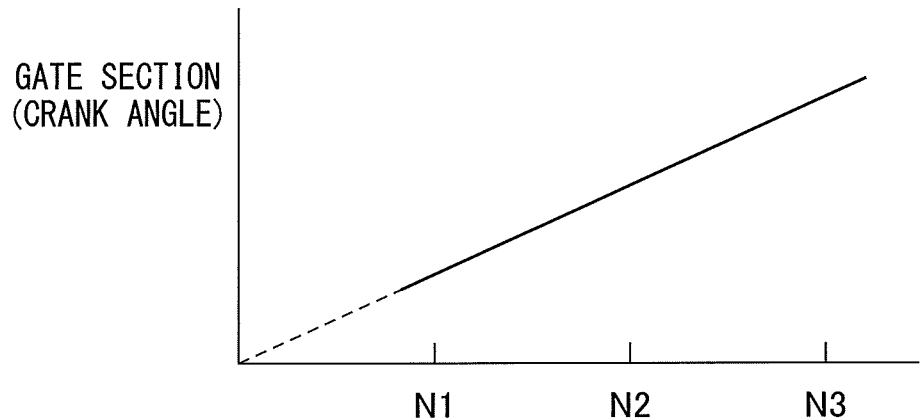
FIG. 19 is a view showing a relationship between a gate section and engine speed.

Next, referring to FIG. 19 and FIG. 20, an embodiment configured to detect the occurrence of knocking based on the output values of the knocking sensor 18 and the output values of the pressure sensor 19 fetched during a fixed time after compression top dead center will be explained. The range of crank angle in which the output values of the knocking sensor 18 and the output values of the pressure sensor 19 are fetched in one cycle of the operation of the engine is called a "gate section". FIG. 19 shows the relationship between the gate section (ordinate) and the engine speed (abscissa) in this embodiment by a solid line. Note that, N1, N2, and N3 on the abscissa show representative engine speeds.

Figure 20:
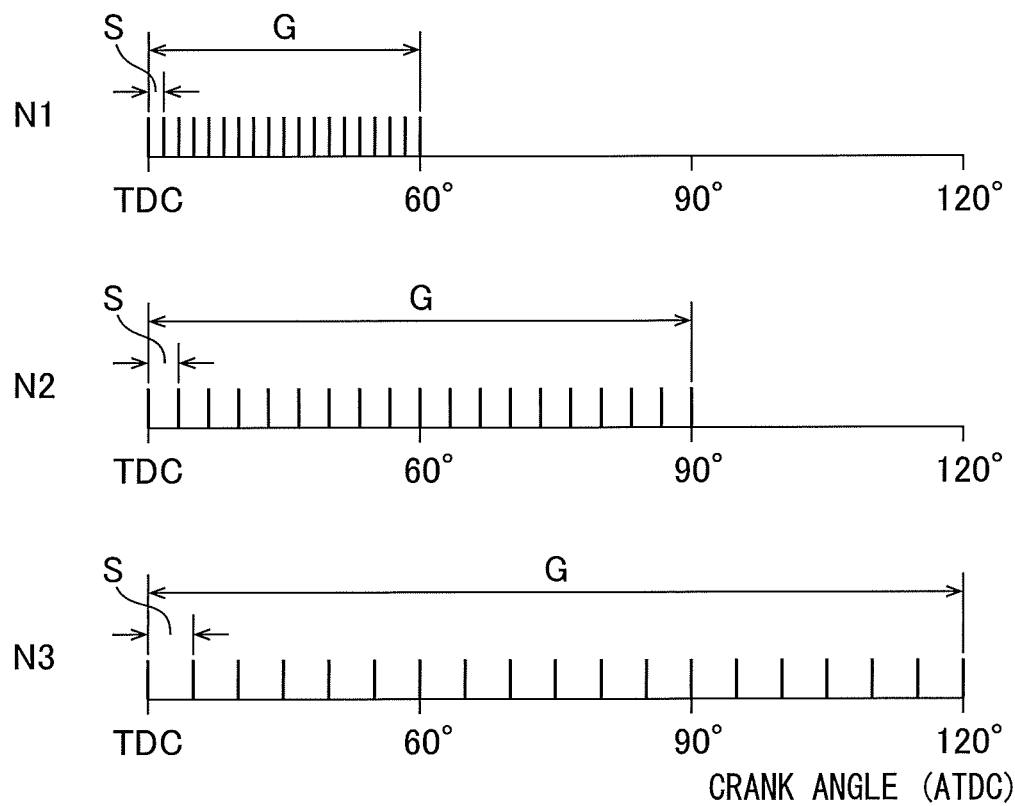
FIG. 20 is a view showing a gate section and divided sections.

On the other hand, FIG. 20 shows gate sections G for the different engine speeds N1, N2, and N3. Further, FIG. 20 shows the different divided sections S in the case of calculating the integral values of the output values of the knocking sensor 18 in the different divided sections divided at equal intervals. From FIG. 19 and FIG. 20, in this embodiment, it is learned that the higher the engine speed, the longer the gate section G. Note that, in the example shown in FIG. 19 and FIG. 20, the time period in which the output values of the knocking sensor 18 and the output values of the pressure sensor 19 are fetched is preset, and this preset time period is made a fixed time. However, this preset time period does not necessarily have to be made a fixed time. The gate section may be set so that the gate section increases as the engine speed increases.

Figure 21A:
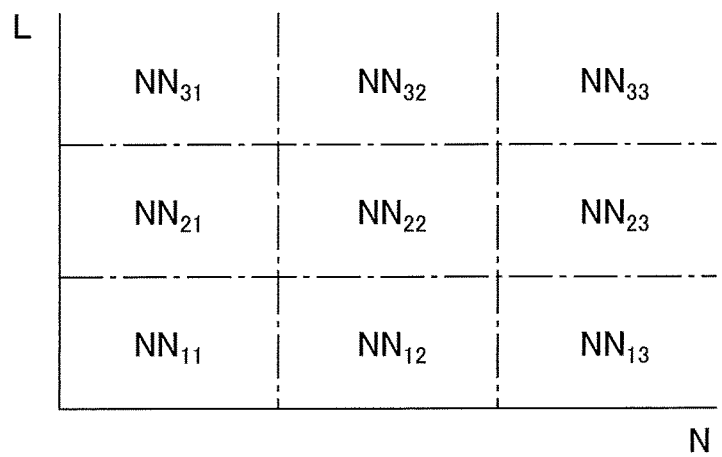
FIG. 21A, FIG. 21B, and FIG. 21C are views showing operating regions.
Figure 21B:
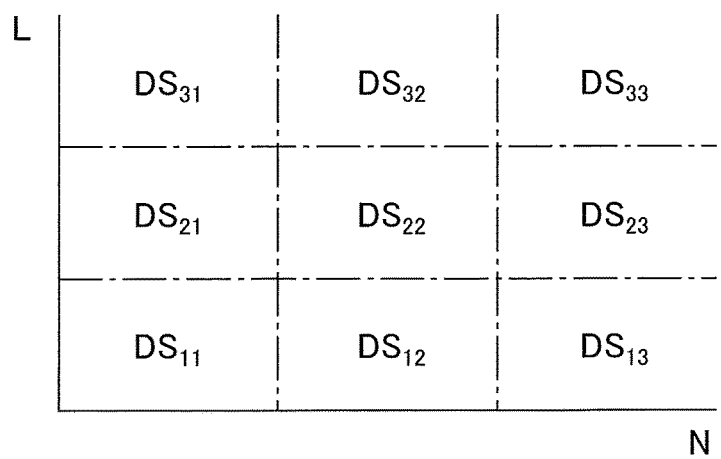
Figure 21C:
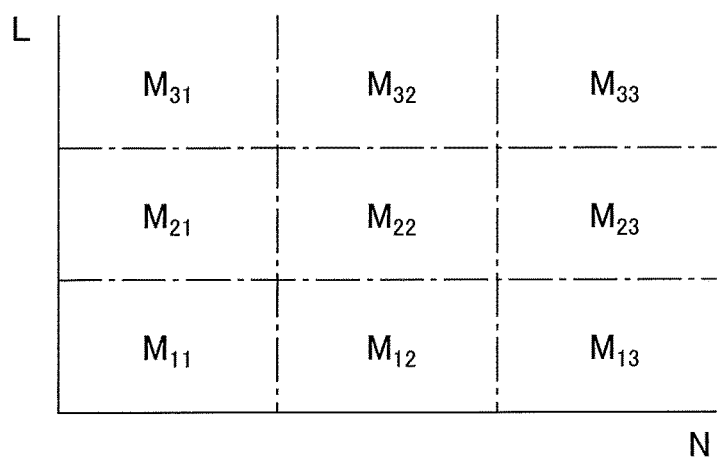

On the other hand, in the embodiment explained above, a single neural network is used to estimate the value representing the knocking strength for all operating regions of the engine. However, if only using a single neural network for all of the operating regions of an engine in this way, there is the danger of the precision of estimation of the value representing the knocking strength falling. To avoid such danger, it is preferable to divide the operating region of the engine into a plurality of operating regions and use respectively separate neural networks for the individual divided operating regions. FIG. 21A to FIG. 21C show embodiments in which respectively separate neural networks are formed for the individual operating regions divided in this way.

That is, in this embodiment, as shown from FIG. 21A to FIG. 21C, the operating region of the engine is divided into a plurality of operating regions corresponding to engine load L and the engine speed N. As shown in FIG. 21A, a separate neural network NNij is formed for each divided operating region. In this case, as shown in FIG. 21B, a training data set DSij such as shown in FIG. 9 is prepared for each divided operating region. The weights of the neural network NNij formed for each divided operating region are learned using the corresponding training data set DSij and using the learning processing routine shown in FIG. 10.

On the other hand, in this embodiment as well, as shown in FIG. 21C, for each divided operating region, a threshold value Mij for the value representing the knocking strength is set. In this embodiment, for each divided operating region, the corresponding neural network NNij is used to calculate the estimated value ye of the value representing the knocking strength using the routine for estimation of the value representing the knocking strength shown in FIG. 13 or FIG. 14. If the estimated value ye of the value representing the knocking strength is calculated, the knocking judgment routine shown in FIG. 15 is used to judge if knocking has occurred using the calculated estimated value ye of the value representing the knocking strength and the corresponding threshold value Mij shown in FIG. 21C.

In this way, in this embodiment, the operating region of the engine is divided into a plurality of operating regions and a neural network NNij is prepared for each divided operating region. Due to the learning device 23, for each divided operating region, the weights of the corresponding neural network NNij are learned using the value representing vibration of the engine body 1 detected by the knocking sensor 18 as an input value of the neural network NNij and using the acquired value representing the knocking strength as training data. For each divided operating region, the value representing the knocking strength is estimated from the output values of the knocking sensor 18 by using the corresponding learned neural network NNij.

Figure 22:
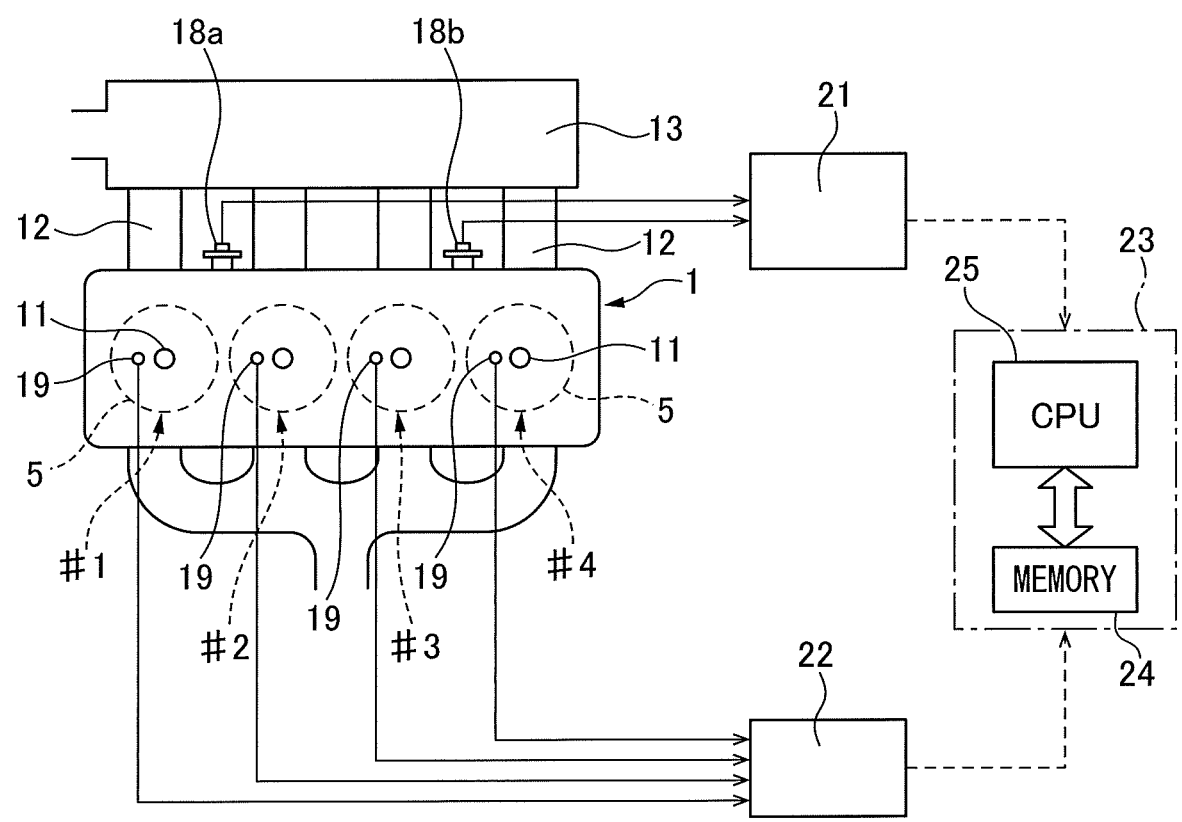
FIG. 22 is an overall view of an internal combustion engine.

FIG. 22 and FIG. 24 show still another embodiment. In this embodiment, as shown in FIG. 22, a knocking sensor 18a and a knocking sensor 18b are attached to the engine body 1. These knocking sensor 18a and knocking sensor 18b are connected to a detector 21 able to detect the waveform of the output value of the knocking sensor 18a and the waveform of the output value of the knocking sensor 18b, for example, an oscilloscope. In FIG. 22, if referring to the No. 1 cylinder #1, No. 2 cylinder #2, No. 3 cylinder #3, and No. 4 cylinder #4 in order from the left, the knocking sensor 18a is arranged at a position of equal distances from the No. 1 cylinder #1 and No. 2 cylinder #2, while the knocking sensor 18b is arranged at a position of equal distances from the No. 3 cylinder #3 and No. 4 cylinder #4. The rest of the configuration shown in FIG. 22 is the same as the configuration shown in FIG. 5. Therefore, explanation of the rest of the configuration shown in FIG. 22 will be omitted.

Figure 23:
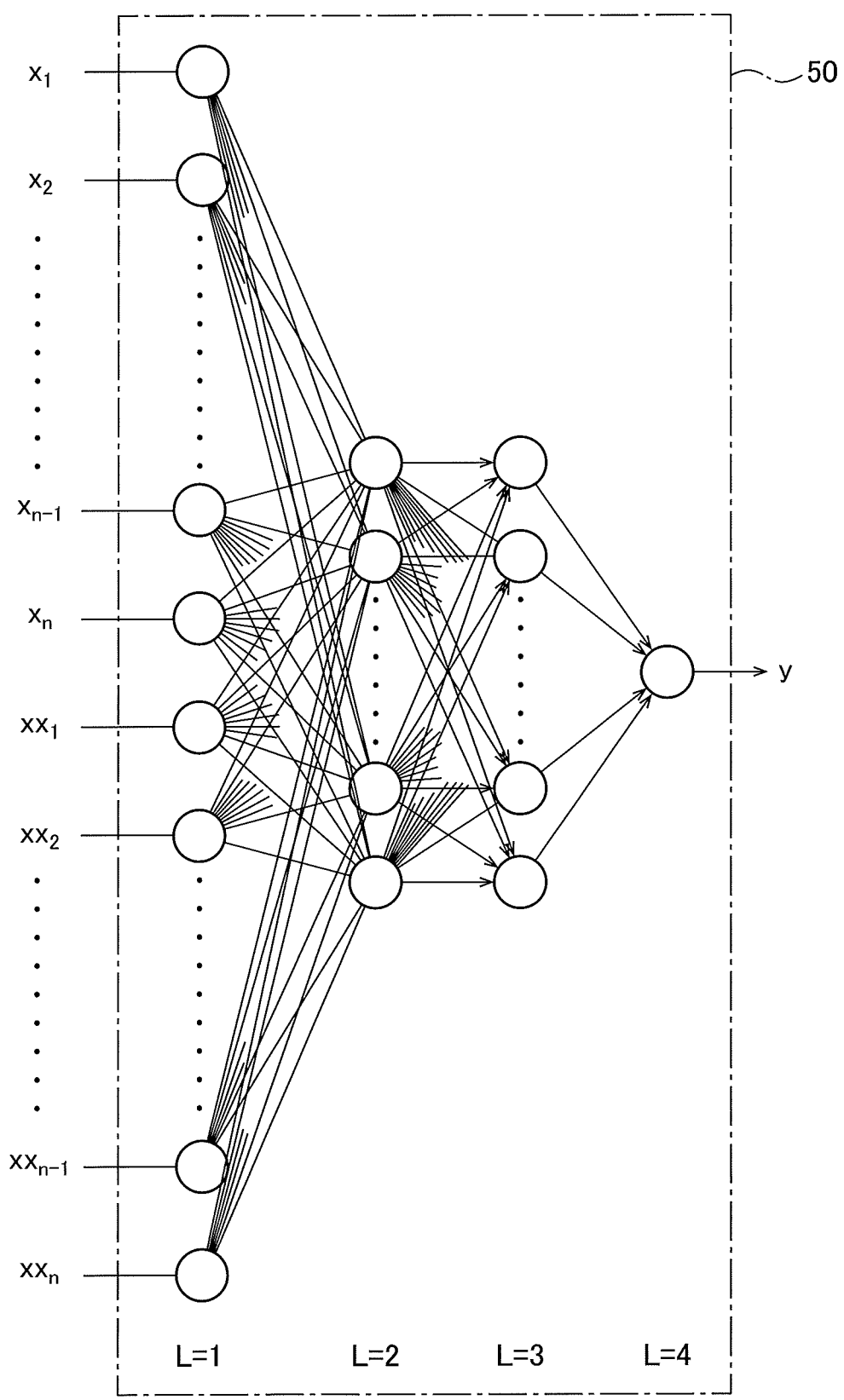
FIG. 23 is a view showing a neural network used in another embodiment according to the present invention.

FIG. 23 shows the neural network 50 used in this embodiment. Referring to FIG. 23, in this neural network 50 as well, in the same way as the neural networks shown in FIG. 3 and FIG. 8, L=1 indicates the input layer, L=2 and L=3 indicate hidden layers, and L=4 indicates the output layer. In this embodiment, as will be understood from FIG. 23, the input layer (L=1) is comprised of $2n$ number of nodes. On the other hand, FIG. 23 describes the hidden layer (L=2) and hidden layer (L=3), but the number of hidden layers can be made one or more layers. Further, the numbers of nodes of the hidden layers can also be made any numbers. Note that, the number of nodes of the output layer (L=4) is made a single node. The output value from the node of the output layer is shown by "y".

In FIG. 23, the input values $x_1, x_2 \ldots x_{n-1}, x_n$ are the output values of the knocking sensor 18a after filtering while the input values $xx_1, xx_2 \ldots xx_{n-1}, xx_n$ are the output values of the knocking sensor 18b after filtering. That is, in this embodiment, the output values after filtering of both of the knocking sensor 18a and the knocking sensor 18b are input to the nodes of the input layer (L=1). Note that, in this embodiment as well, as the input values $x_1, x_2 \ldots xx_{n-1}, xx_n$, the values shown in FIG. 6B or the values shown in FIG. 6C are used. That is, as shown in FIG. 6B, the output values of the knocking sensor 18a and the knocking sensor 18b after filtering themselves are made the input values $x_1, x_2 \ldots xx_{n-1}, xx_n$ or, as shown in FIG. 6C, the integral values of the output values of the knocking sensor 18a and the knocking sensor 18b after filtering (negative side integral values also made positive values), for example, the integral values of the output values of the knocking sensor 18a and the knocking sensor 18b in a certain crank angle, are made the input values $x_1, x_2 \ldots xx_{n-1}, xx_n$.

On the other hand, as the output value "y" shown in FIG. 23, in the same way as the case shown in FIG. 8, the value representing the knocking strength found from the output values of the pressure sensor 19 is employed. In this case, in the same way as the case shown in FIG. 8, the peak value of the output values of the pressure sensor 19 after filtering shown by the dot in FIG. 7B is used as the output value "y" or the integral value of the output values of the pressure sensor 19 after filtering shown in FIG. 7C (negative side integral values also made positive values) is used as the output value "y". Note that, in this embodiment as well, the measured value of the value representing the knocking strength found from the output values of the pressure sensor 19 is made the training data yt.

FIG. 24 shows a training data set prepared using the input values $x_1, x_2 \ldots xx_{m-1}, xx_m$ and using the measured value of the value representing the knocking strength found from the output values of the pressure sensor 19, that is, the training data yt. As shown in FIG. 24, in this training data set, "m" number of data showing the relationship between the input values $x_1, x_2 \ldots xx_{n-1}, xx_n$ and the training data yt are acquired. The method of preparation of this training data set is the same as the method of preparation of the training data set shown in the already explained FIG. 9. That is, when preparing a training data set, in FIG. 22, the engine is operated so that both states of operating states where knocking does not occur and operating states where knocking does occur are caused for various combinations of engine load and engine speed, and a training data set such as shown in FIG. 24 is prepared based on the data obtained from the detectors 21 and 22 at this time.

If the training data set is prepared, electronic data of the prepared training data set is used for learning the weights of the neural network 50 shown in FIG. 23. The learning method of the weights of this neural network is the same as the learning method of the weights of the neural network explained above referring to FIG. 5. That is, when learning the weights of the neural network 50 shown in FIG. 23, the number of nodes of the neural network 50 and the electronic data of the prepared training data set are stored in the memory 24 of the learning device 23 shown in FIG. 22. In the CPU 25, the learning processing routine shown in FIG. 10 is used for learning the weights of the neural network 60. In this case, the weights of the neural network 50 can also be learned by the electronic control unit 30 shown in FIG. 1. In this case, the number of nodes of the neural network 50 shown in FIG. 23 and the electronic data of the prepared training data set are stored in the memory 32 of the electronic control unit 30. In the CPU 33, the learning processing routine shown in FIG. 10 is used for learning the weights of the neural network 20.

In this way, in this embodiment, a plurality of the knocking sensors 18a and 18b for detecting vibration of the engine body 1 are provided. Due to the learning device 23 or electronic control unit 30, weights of the neural network 50 are learned using values representing vibration of the engine body 1 detected by the plurality of knocking sensors 18a and 18b as input values of the neural network 50 and using the acquired value representing the knocking strength as training data. The value representing the knocking strength is estimated from the output values of the plurality of knocking sensors 18a and 18b by using the learned neural network 50.

If in this way using a plurality of knocking sensors 18a and 18b and using the output values of both of the knocking sensors 18a and 18b for learning the weights of the neural network 50, compared to when using one knocking sensor, it is possible to precisely estimate the value representing the knocking strength due to the increase in the amount of information which can be acquired.

The invention claimed is:

1. A knocking detection system of an internal combustion engine comprising:
   a knocking sensor detecting vibration of an engine body,
   a pressure sensor detecting a pressure inside a combustion chamber of the internal combustion engine,
   a learning device for using a neural network to estimate a value representing a knocking strength of the internal combustion engine, and
   a controller configured to control ignition of the internal combustion engine based on the value of the knocking strength of the internal combustion engine, wherein
   the value representing the knocking strength is acquired from output values of the pressure sensor,
   weights of the neural network are learned by the learning device by using the value representing vibration of the engine body detected by the knocking sensor as an input value of the neural network and using the acquired value representing the knocking strength as training data, and
   the value representing the knocking strength is estimated from the output values of the knocking sensor by using the learned neural network.

2. The knocking detection system of an internal combustion engine according to claim 1, wherein the value representing the knocking strength is a peak value of the output values of the pressure sensor within a preset time period.

3. The knocking detection system of an internal combustion engine according to claim 1, wherein the value representing the knocking strength is an integral value of the output values of the pressure sensor within a preset time period.

4. The knocking detection system of an internal combustion engine according to claim 1, wherein the value representing vibration of the engine body is an output value of the knocking sensor within a preset time period.

5. The knocking detection system of an internal combustion engine according to claim 1, wherein the value representing vibration of the engine body is an integral value of the output values of the knocking sensor in a section equally divided within a preset time period.

6. The knocking detection system of an internal combustion engine according to claim 1, wherein the preset time period is a fixed range of crank angle.

7. The knocking detection system of an internal combustion engine according to claim 1, wherein the preset time period is a fixed time.

8. The knocking detection system of an internal combustion engine according to claim 1, wherein the operating region of the engine is divided into a plurality of operating regions, neural networks are prepared for the divided operating regions, and, due to the learning device, for each divided operating region, weights of the corresponding neural network are learned using the value representing vibration of the engine body detected by the knocking sensor as an input value of the neural network and using the acquired value representing the knocking strength as training data, and, for each divided operating region, the value representing the knocking strength is estimated from the output values of the knocking sensor by using the corresponding learned neural network.

9. The knocking detection system of an internal combustion engine according to claim 1, wherein a plurality of knocking sensors for detecting vibration of the engine body are provided, due to the learning device, the weights of the neural network are learned using values representing vibration of the engine body detected by the plurality of knocking sensors as input values of the neural network and using the acquired values representing the knocking strength as training data, and the value representing the knocking strength is estimated from the output values of the plurality of knocking sensors by using the learned neural network.

10. The knocking detection system of an internal combustion engine according to claim 1, wherein an occurrence of knocking is judged from the estimated value of the value representing the knocking strength.

11. A knocking detection method of an internal combustion engine using a neural network to estimate a knocking strength of the internal combustion engine based output values of a knocking sensor detecting vibration of an engine body and output values of a pressure sensor detecting a pressure of a combustion chamber of the internal combustion engine, wherein said knocking detection method comprises:
   finding a value representing the knocking strength from the output values of the pressure sensor,
   preparing a training data set showing a relationship between the value representing vibration of the engine body detected by the knocking sensor and the value representing the knocking strength,
   learning weights of the neural network using the value representing vibration of the engine body detected by the knocking sensor as an input value of the neural network and using the acquired value representing the knocking strength as training data, using the learned neural network to estimate the value representing the knocking strength from the output values of the knocking sensor, and controlling ignition of the internal combustion engine based on the knocking strength.

12. A non-transitory computer readable storage medium sorting a computer program, that when executed by a processor, implements a knocking detection method of an internal combustion engine using a neural network to estimate a knocking strength of the internal combustion engine based output values of a knocking sensor detecting vibration of an engine body and output values of a pressure sensor detecting a pressure of a combustion chamber of the internal combustion engine comprising:

finding a value representing the knocking strength from the output values of the pressure sensor, preparing a training data set showing a relationship between the value representing vibration of the engine body detected by the knocking sensor and the value representing the knocking strength, learning weights of the neural network using the value representing vibration of the engine body detected by the knocking sensor as an input value of the neural network and using the acquired value representing the knocking strength as training data, using the learned neural network to estimate the value representing the knocking strength from the output values of the knocking sensor, and controlling ignition of the internal combustion engine based on the knocking strength.

* * * * *